United States Patent
Jaegal

(10) Patent No.: US 10,431,069 B2
(45) Date of Patent: Oct. 1, 2019

(54) APPARATUS, METHOD AND MOBILE TERMINAL FOR PROVIDING OBJECT LOSS PREVENTION SERVICE IN VEHICLE

(71) Applicant: LG ELECTRONICS INC., Seoul (KR)

(72) Inventor: Chan Jaegal, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 339 days.

(21) Appl. No.: 15/150,092

(22) Filed: May 9, 2016

(65) Prior Publication Data

US 2017/0098364 A1 Apr. 6, 2017

(30) Foreign Application Priority Data

Oct. 2, 2015 (KR) .................. 10-2015-0139344

(51) Int. Cl.
| | |
|---|---|
| *G08B 21/24* | (2006.01) |
| *H04W 4/80* | (2018.01) |
| *G06K 9/00* | (2006.01) |
| *B60Q 9/00* | (2006.01) |
| *H04W 88/02* | (2009.01) |

(52) U.S. Cl.
CPC .............. *G08B 21/24* (2013.01); *B60Q 9/00* (2013.01); *G06K 9/00832* (2013.01); *H04W 4/80* (2018.02); *H04W 88/02* (2013.01)

(58) Field of Classification Search
None
See application file for complete search history.

(56) References Cited

U.S. PATENT DOCUMENTS

| | | | |
|---|---|---|---|
| 6,104,293 A | 8/2000 | Rossi | |
| 9,041,645 B2 * | 5/2015 | Plaehn | G06F 3/013 |
| | | | 345/156 |
| 2002/0140215 A1 * | 10/2002 | Breed | B60N 2/853 |
| | | | 280/735 |
| 2009/0187640 A1 * | 7/2009 | Delia | G06Q 10/00 |
| | | | 709/219 |

(Continued)

FOREIGN PATENT DOCUMENTS

| | | |
|---|---|---|
| JP | 2008-27239 A | 2/2008 |
| JP | 2009-75756 A | 4/2009 |

(Continued)

OTHER PUBLICATIONS

Tian et al., "Robust Detection of Abandoned and Removed Objects in Complex Surveillance Videos," IEEE Transactions on Systems, Man, and Cybernetics, Part C, Applications and Reviews, vol. 41, No. 5, IEEE Service Center, Piscataway, NJ, US, Sep. 1, 2011, XP011380994, pp. 565-576.

*Primary Examiner* — Lindsay J Uhl
(74) *Attorney, Agent, or Firm* — Birch, Stewart, Kolasch & Birch, LLP

(57) ABSTRACT

An apparatus for providing an object loss prevention service in a vehicle, and which includes a sensor unit configured to sense an in-vehicle object of a passenger inside the vehicle; and a processor configured to display in-vehicle object state information including at least one of a position of the object and a type of the object, and output an alarm indicating the object has been left in the vehicle in response to the passenger getting out of the vehicle.

17 Claims, 32 Drawing Sheets

(01)

(02)

(03)

(56) References Cited

U.S. PATENT DOCUMENTS

| | | | | |
|---|---|---|---|---|
| 2013/0033381 A1* | 2/2013 | Breed | ................ | B60T 1/005 340/568.1 |
| 2014/0327940 A1* | 11/2014 | Amtrup | .............. | H04N 1/00251 358/473 |
| 2014/0347475 A1* | 11/2014 | Divakaran | ......... | G06K 9/00771 348/135 |
| 2015/0116103 A1* | 4/2015 | Yang | ................ | G08B 21/24 340/438 |
| 2015/0137985 A1* | 5/2015 | Zafiroglu | ................ | B60R 16/02 340/686.1 |
| 2016/0332535 A1* | 11/2016 | Bradley | ................ | B60N 2/002 |

FOREIGN PATENT DOCUMENTS

| | | |
|---|---|---|
| JP | 2012-123491 A | 6/2012 |
| JP | 2013-191053 A | 9/2013 |
| KR | 10-2013-0112461 A | 10/2013 |
| KR | 10-2014-0005561 A | 1/2014 |
| KR | 10-2014-0007709 A | 1/2014 |

\* cited by examiner

APPARATUS, METHOD AND MOBILE TERMINAL FOR PROVIDING OBJECT LOSS PREVENTION SERVICE IN VEHICLE

CROSS-REFERENCE TO RELATED APPLICATIONS

The present application claims priority under 35 U.S.C. § 119 and 35 U.S.C. § 365 to Korean Patent Application No. 10-2015-0139344 filed on Oct. 2, 2015, which is hereby incorporated by reference in its entirety.

BACKGROUND OF THE INVENTION

Field of the Invention

The present disclosure relates to an apparatus, method and mobile terminal for providing an object loss prevention service in a vehicle.

Discussing of the Related Art

A vehicle such as a car includes various sensors and electronic devices for the driving convenience of a user. In addition, object loss prevention systems are available and senses there are objects in the vehicle and notifies the user before a passenger gets out of the vehicle in order to prevent the passenger from leaving his or her belongings in the vehicle.

However, a typical object loss prevention system only senses the presence and absence of an object in a vehicle and object this inconvenient to the user.

SUMMARY OF THE INVENTION

Embodiments provide an apparatus, method and mobile terminal for providing an object loss prevention service in a vehicle in order to overcoming the limitation as described above.

In one embodiment, an apparatus for providing an object loss prevention service includes a sensor unit sensing an in-vehicle object; a processor detecting characteristics of the detected object and generating in-vehicle object state information according to the characteristics; and an alarm unit notifying the in-vehicle object state information, Wherein the processor generates the in-vehicle object state information to represent characteristics of the object including at least one of a position of the object, a type of the object, and a loss time of the object, and controls a notification method of the alarm unit.

In another embodiment, an apparatus for providing an object loss prevention service includes a sensor unit sensing an object inside a vehicle; a processor detecting characteristics of the detected object and generating in-vehicle object state information according to the characteristics; and a display unit displaying the in-vehicle object state information as an image, wherein the display unit includes a window display that displays, as an image, the in-vehicle object state information on side glass of the vehicle In further another embodiment, a method of providing an object loss prevention service includes sensing at least two of an in-vehicle image before getting in the vehicle, an in-vehicle image after getting in the vehicle, an in-vehicle image when a vehicle stops, and an in-vehicle image after getting out of the vehicle; comparing at least two of the in-vehicle images to detect the in-vehicle object and generate characteristic information on the object; detecting whether the object is carried, and notifying the characteristic information on the object through an alarm unit inside a vehicle when negative; and transmitting the characteristic information to a mobile terminal when the object is detected after getting out of the vehicle.

In still further another embodiment, a mobile terminal for providing an object loss prevention service includes a wireless communication unit receiving in-vehicle object state information reflecting characteristics of an in-vehicle object; a touch screen displaying the in-vehicle object state information; and a control unit providing, through the touch screen, a graphic user interface that manages the in-vehicle object state information, wherein the characteristics includes at least one of a position of the object, a type of the object, an owner of the object, a loss time of the object, and an icon standing for the object.

The details of one or more embodiments are set forth in the accompanying drawings and the description below. Other features will be apparent from the description and drawings, and from the claims.

DETAILED DESCRIPTION OF THE EMBODIMENTS

Figure 1:
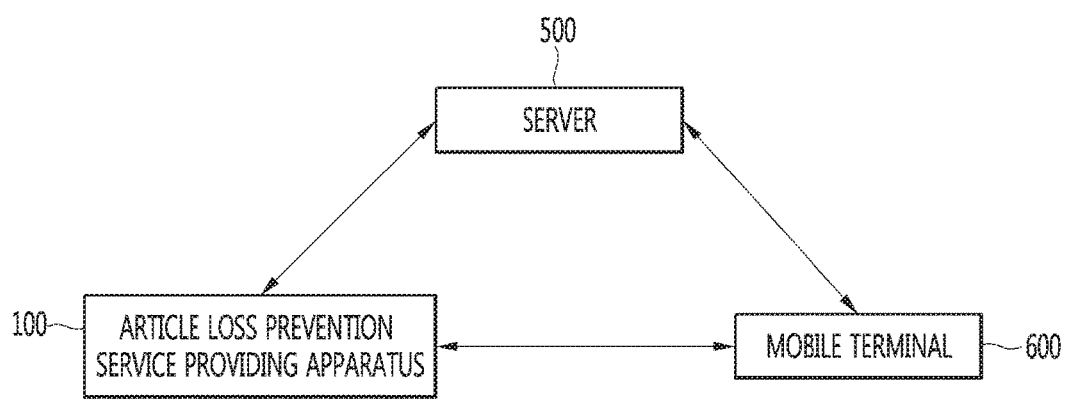
FIG. 1 is a block diagram of an object loss prevention service providing system according to an embodiment.

Hereinafter, embodiments are described in detail with reference to the accompanying drawings and regardless of the numbers of the drawings, same or similar components are assigned with the same reference numerals and thus repetitive descriptions for those are omitted. Since the suffixes "module" and "unit" for components used in the following description are given and interchanged for easiness in making the present disclosure, they do not have distinct meanings or functions. In addition, the accompanying drawings are used to help easily understanding embodiments disclosed herein but the technical idea disclosed in the present disclosure is not limited thereto. It should be understood that all of variations, equivalents or substitutes contained in the concept and technical scope of the inventive concept are also included.

Although the terms 'first' and 'second' may be used to describe various components, these components should not be limited to these terms. The terms are used only in order to distinguish a component from another component. When it is mentioned that any component is "connected" or "accessed" to another component, it should be understood that the former can be directly connected to the latter, or there may be another component in between. On the contrary, when any component is referred to as being 'directly connected' or 'directly accessed' to another component, it should be understood that there may be no other component in between.

The terms in singular form include the plural form unless otherwise specified. It should be understood that the term "includes" or "has" indicates the presence of characteristics, numbers, steps, operations, components, parts or combinations thereof represented in the present disclosure but does not exclude the presence or addition of one or more other characteristics, numbers, steps, operations, components, parts or combinations thereof.

A vehicle discussed in the present disclosure may include a car or motorcycle. In the following, the car of the vehicle is mostly discussed. The vehicle discussed in the present disclosure may include an internal combustion engine vehicle that includes an engine as a power source, a hybrid vehicle that includes an engine and an electrical motor as a power source, and an electrical vehicle that includes an electrical motor as a power source.

In the following description, the right side of the vehicle means the left side of the driving direction of the vehicle and the right side of the vehicle means the right side of the driving direction of the vehicle. In the following description, a left hand drive (LHD) vehicle is mostly described unless mentioned to the contrary.

FIG. 1 is a block diagram of an object loss prevention service providing system according to an embodiment. Referring to FIG. 1, the object loss prevention service providing system includes an object loss prevention service providing apparatus 100 that is disposed in a vehicle, a mobile terminal 600 that provides an object loss prevention service, and a server 500 that includes an image search DB.

In addition, the object loss prevention service providing apparatus 100 can detect an object in a vehicle. In this instance, the object loss prevention service providing apparatus 100 can detect the characteristic of the object as well as the object itself and notify a user of in-vehicle object state information to which the characteristic has been applied so that it is possible to provide an object loss prevention service to prevent a passenger from losing the object when the passenger gets out of the vehicle. In this example, the loss means that a passenger leaves an object in a vehicle.

Also, the characteristic of the object may include at least one of the location of an object, a type of an object, an object owner, the loss time of an object, and an icon standing for an object and the characteristics of the object may be stored as characteristic information. Further, the object loss prevention service providing apparatus 100 can transmit information on the lost object to the mobile terminal 600 of a passenger even after getting out of the vehicle, and thus helps the passenger to be aware of a loss state. In this instance, the information on the lost object includes characteristic information so that the passenger can feel that he or she needs to carry the lost object, be aware of in-vehicle goods and effectively manage them.

The object loss prevention service providing apparatus 100 can use the server 500 including an image search DB in order to generate characteristic information. In addition, the object loss prevention service providing apparatus 100 is described in more detail with reference to FIGS. 2 to 10.

In addition, the object loss prevention service providing apparatus 100 can be disposed in a vehicle. In this example, the object loss prevention service providing apparatus 100 is an apparatus separated from the vehicle, may provide an object loss prevention service while transmitting and receiving information through data communication with the vehicle, and also define some units of the vehicle as the object loss prevention service providing apparatus 100.

When being a separate apparatus, some units of the object loss prevention service providing apparatus 100 can not be included in the object loss prevention service providing apparatus 100 but be units of a vehicle or units of another apparatus in the vehicle. Since these units transmit and receive data through the interface unit of the object loss prevention service providing apparatus 100, they may be understood to be included in the object loss prevention service providing apparatus 100.

Figure 2:
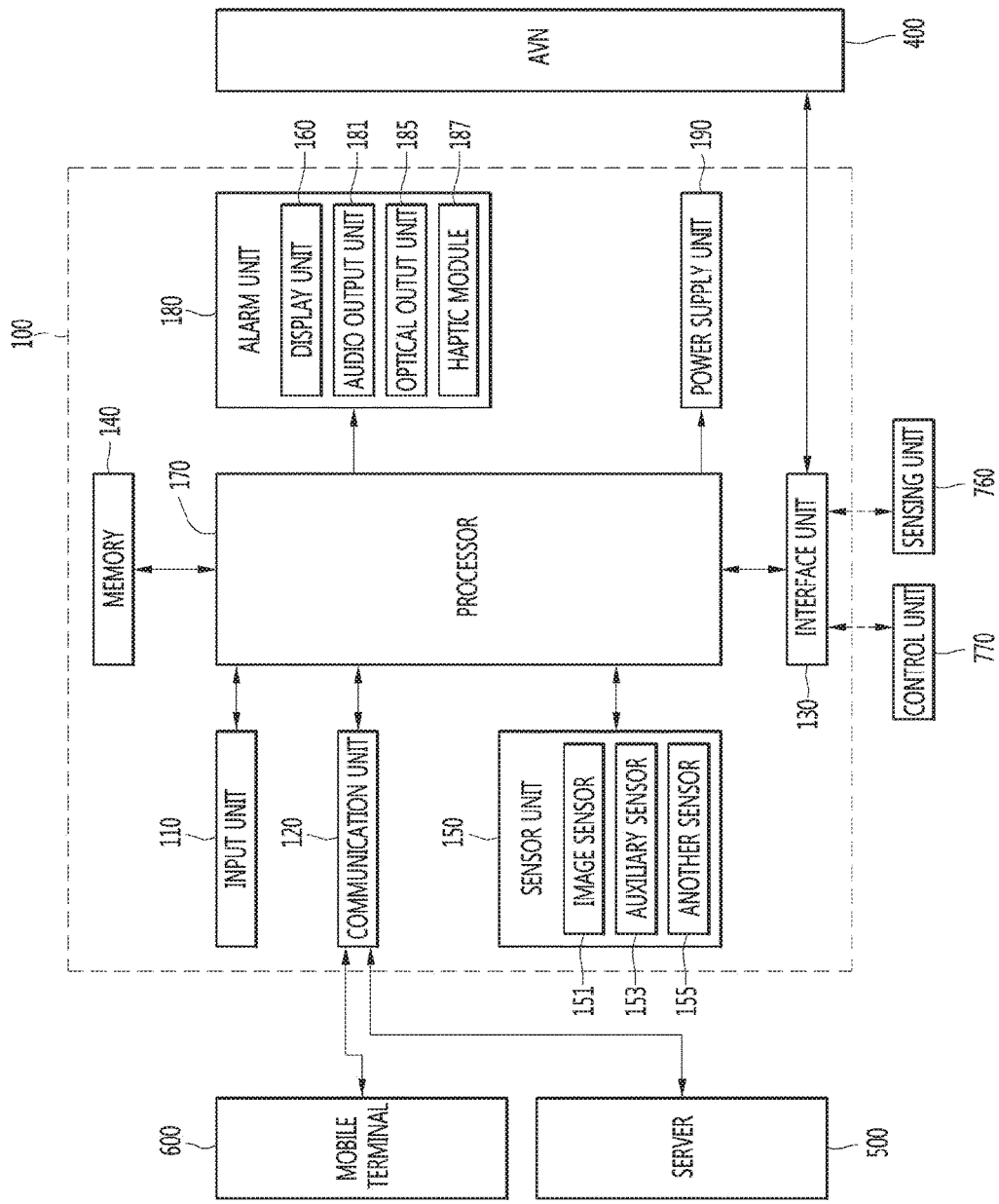
FIG. 2 is a block diagram of an object loss prevention service providing apparatus according to an embodiment.

Referring to FIG. 2, such an object loss prevention service providing apparatus 100 can include an input unit 110, a communication unit 120, an interface unit 130, a memory 140, a sensor unit 150, a processor 170, an alarm unit 180, and a power supply unit 190. object Further, the object loss prevention service providing apparatus 100 as described in the present disclosure may have more components or less components than the above-enumerated components.

In addition, the object loss prevention service providing apparatus 100 can include the input unit 110 that senses a user's input. In particular, the input unit 110 can enable/disable an object loss prevention service function by a user or sense an execution input that enables/disables the power supply of the object loss prevention service providing apparatus 100 itself.

Further the user can sense a user input that controls the object loss prevention service function through the input unit 110. Such an input unit 110 may include at least one of a gesture input unit that senses a user gesture, a touch input unit that senses a touch, and a microphone that senses a voice input, and thus sense a user input.

In particular, the touch input unit may be combined with a display unit to be implemented as a touch screen, and the processor 170 can provide a graphic user interface (GUI) between the object loss prevention service providing apparatus 100 and the user through the touch screen.

Next, the object loss prevention service providing apparatus 100 can include a communication unit 120 that performs communication with another vehicle 510, the mobile terminal 600, the server 500, etc. The processor 170 can transmit and receive data on an in-vehicle object to and from the mobile terminal 600 through the communication unit 120 so that it is possible to provide the object loss prevention service to a user even after getting out of the vehicle.

In addition, the processor 170 can request a search for an in-vehicle object image from the server 500 that includes an image search DB through the communication unit 120, and detect a type of an object. Specifically, the communication unit 120 may exchange data with the mobile terminal 600 or the server 500 wirelessly. In particular, the communication unit 120 may wirelessly exchange data with the mobile terminal 600 of a user inside or outside the vehicle.

Specifically, the communication unit 120 is used for short-range communication when the mobile terminal 600 approaches the vehicle, and may support communication with the mobile terminal 600 by using at least one of Bluetooth™, Radio Frequency Identification (RFID), Infrared Data Association (IrDA), Ultra Wideband (UWB), Zig-Bee, Near Field Communication (NFC), Wireless-Fidelity (Wi-Fi), Wi-Fi Direct, and Wireless Universal Serial Bus (Wireless USB) communication technologies.

If the mobile 600 is located in a long distance from the vehicle, the communication unit 120 may support communication with the mobile terminal 600 through a wireless internet communication technology, such as wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), etc.

Also, when a user gets in the vehicle, the mobile terminal 600 of the user and the object loss prevention service providing apparatus 100 can perform pairing automatically or by the execution of an application by the user. If the processor 170 maintains the pairing of the mobile terminal 600 even when a passenger gets out of the vehicle, it is possible to detect that the mobile terminal 600 is in a loss state. That is, the processor 170 can utilize the communication unit 120 as the sensor unit 150 to detect that the mobile terminal 600 is a lost object and generate characteristic information on the mobile terminal 600.

Further, the object loss prevention service providing apparatus 100 can include an interface unit 130 that receives vehicle related data or transmits a signal processed or generated by the processor 170 to the outside. Specifically, the object loss prevention service providing apparatus 100 can receive sensor information from the sensing unit 760 of the vehicle through the interface unit 130.

Also, when the object loss prevention service providing apparatus 100 does not include the communication unit 120, it is possible to connect to the communication unit 120 of the vehicle through the interface unit 130 to exchange data with the mobile terminal 600 or server 500 wirelessly. Thus, the interface unit 130 can perform data communication with the control unit 770, an audio video navigation (AVN) device 400 and the sensor unit 760 in the vehicle through wired or wireless communication.

The interface unit 130 can receive navigation information through data communication with the control unit 770, the AVN device 400 and/or a separate navigation device. In addition, the navigation information may include a destination, path information, vehicle location information, and location information on a mobile terminal of a passenger. Further the interface unit 130 can receive sensor information from the control unit 770 or the sensing unit 760.

In this example, the sensor information may include information on whether a passenger gets in/out of the vehicle, information on whether the vehicle stops, and on/off information on a compartment of the vehicle. For example, the sensing unit of the vehicle may include a door on/off sensor of the vehicle, through which the interface unit 130 can receive information on whether or where the passenger gets in/off the vehicle.

In addition, the sensing unit of the vehicle may include an ignition on/off sensor of the vehicle so that the interface unit 130 may receive as sensor information whether the vehicle stops according to ignition on/off. The interface unit 130 may receive a user input received through the user input unit 110 of the vehicle. The interface unit 130 may receive the user input from the user input unit of the vehicle or through the control unit 770. That is, when the input unit is disposed as a component of the vehicle therein, it is possible to receive the user input through the interface unit 130.

The interface unit 130 may also receive traffic information acquired from the server 500. The server 500 may be a server that is located at a traffic control center controlling traffic. For example, when the traffic information is received from the server 500 through the communication unit 120 of the vehicle, the interface unit 130 may also receive the traffic information from the control unit 770.

Next, the memory 140 can store various pieces of data for the overall operations of the object loss prevention service providing apparatus 100, such as programs for processing or controlling by the processor 170. The memory 140 may store data for object check. For example, the memory 140 may store data for checking through a certain algorithm what an object is when a certain object is detected from an in-vehicle image acquired through an image sensor.

In addition, the memory 140 may store data on object information as data for the object check. For example, the memory 140 may also include an image search DB comparing a detected object with a type of an object by a certain algorithm when a certain object, such as a mobile terminal 600, a key, etc. is detected from an image acquired through a camera. The memory 140 may be various storage devices, such as ROMs, RAMs, EPROMs, flash drives, hard drives, etc. that are hardware.

Next, the object loss prevention service providing apparatus 100 can include the sensor unit 150 that senses an object inside vehicle. Specifically, the sensor unit 150 may include an image sensor 151, auxiliary sensor 153 and another sensor 155 that sense an in-vehicle image.

Figure 3:
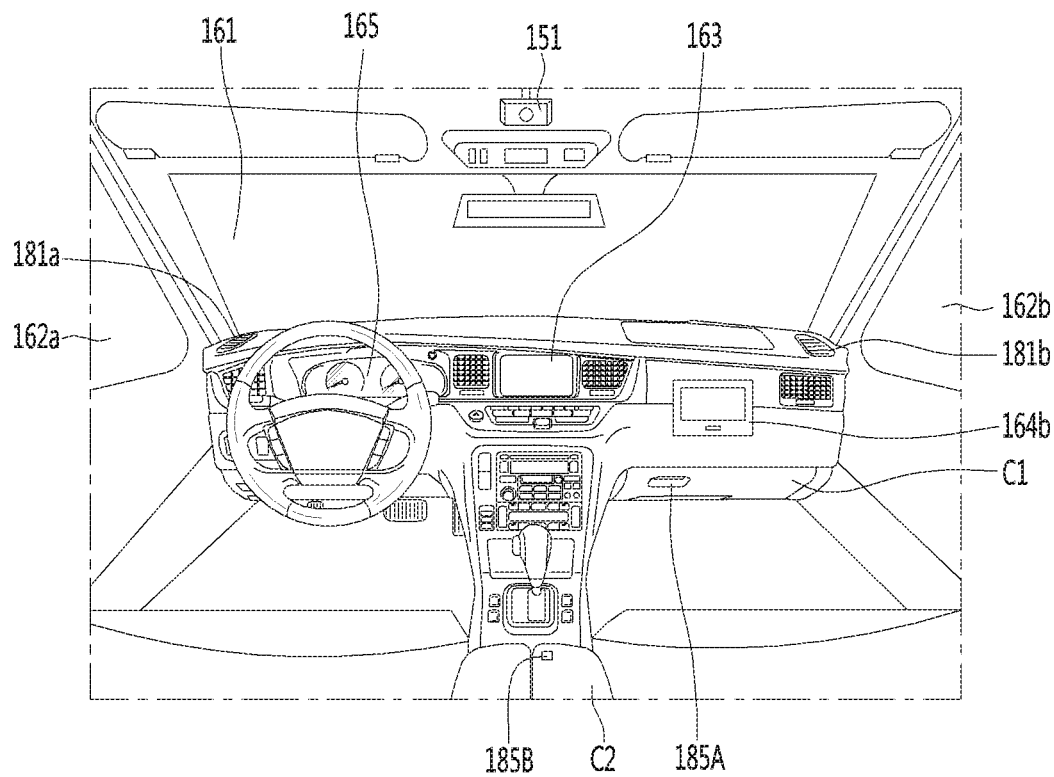
FIG. 3 is a diagram showing the interior of a vehicle that includes an object loss prevention service providing apparatus according to an embodiment.

Referring to FIG. 3, the image sensor 151 may be a camera that is disposed at the ceiling of the vehicle to capture an in-vehicle image. Such a camera may include the image sensor and an image processing module. The camera can process a still image or video that is obtained by the image sensor (e.g., CMOS or CCD). The image processing module can process the still image or video obtained through the image sensor 151 to extract necessary information and deliver the extracted information to the processor 170.

In the following, the processes of detecting an in-vehicle object by the image sensor 151 and the processor 170 and generating characteristic information on an object are described in detail with reference to FIGS. 4 and 5. In addition, the image sensor 151 can sense at least two of an in-vehicle image before getting in the vehicle, an in-vehicle image after getting in the vehicle, an in-vehicle image when the vehicle stops, and an in-vehicle image after getting out of the vehicle.

Specifically, the image sensor 151 can acquire the in-vehicle image before getting in and the acquired image can be used as a comparison target image. That is, the processor 170 can detect an added object O as an in-vehicle object from an in-vehicle image that is captured later, based on the in-vehicle image before getting in.

The processor 170 can divide the in-vehicle image before getting in into spaces to detect objects so that it is possible to generate the position of an object as characteristic information. Specifically, the processor 170 can divide spaces based on the seats of the vehicle and designate a compartment as a separate space so that it is possible to accurately identify the position of an object when an object is detected from each space.

Figure 4A:
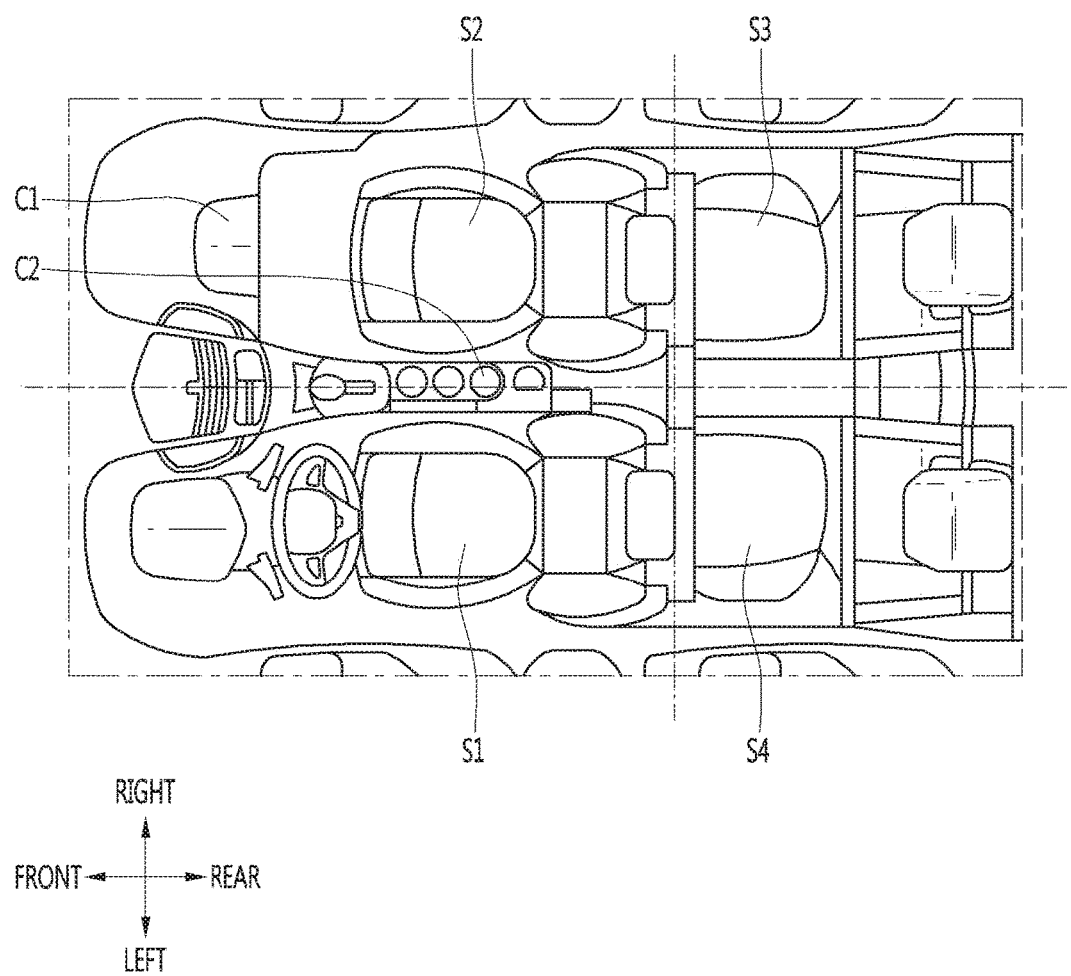
FIGS. 4A to 4C are diagrams illustrating explaining a method of detecting an object in a vehicle by a sensor unit according to an embodiment.

For example, referring to FIG. 4A, the processor 170 can divide a space into a first space S1 and a second space S2 according to the seats of the vehicle, designate a compartment before the second space S2 as a first compartment C1 and a compartment between the first space S1 and the second space S2 as a second compartment C2, and then it is possible to detect a space or compartment where a detected object exists, as the position of the object.

The image sensor 151 can acquire an in-vehicle image after getting in and the acquired image can be used for detecting an in-vehicle object. Specifically, the processor 170 can compare an in-vehicle image before getting in the vehicle with an in-vehicle image after getting in the vehicle to detect, as an in-vehicle object, an object added to the in-vehicle image before getting in the vehicle.

In this instance, an object representing a passenger may be excluded from a detection target and utilized as information for identifying the position of the passenger. In addition, the processor 170 can use the information for identifying the position of the passenger to detect an owner of a lost object later. The processor 170 can determine a notification position according to the position of the passenger detected in this way.

Figure 4B:
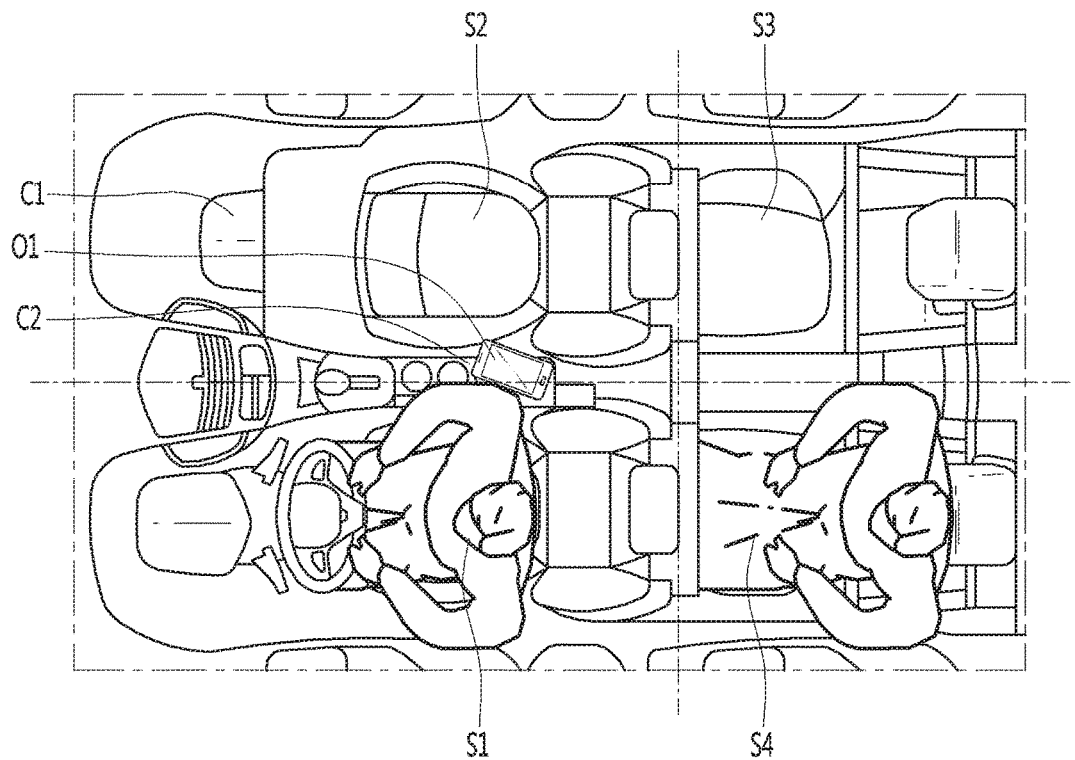
Figure 4C:
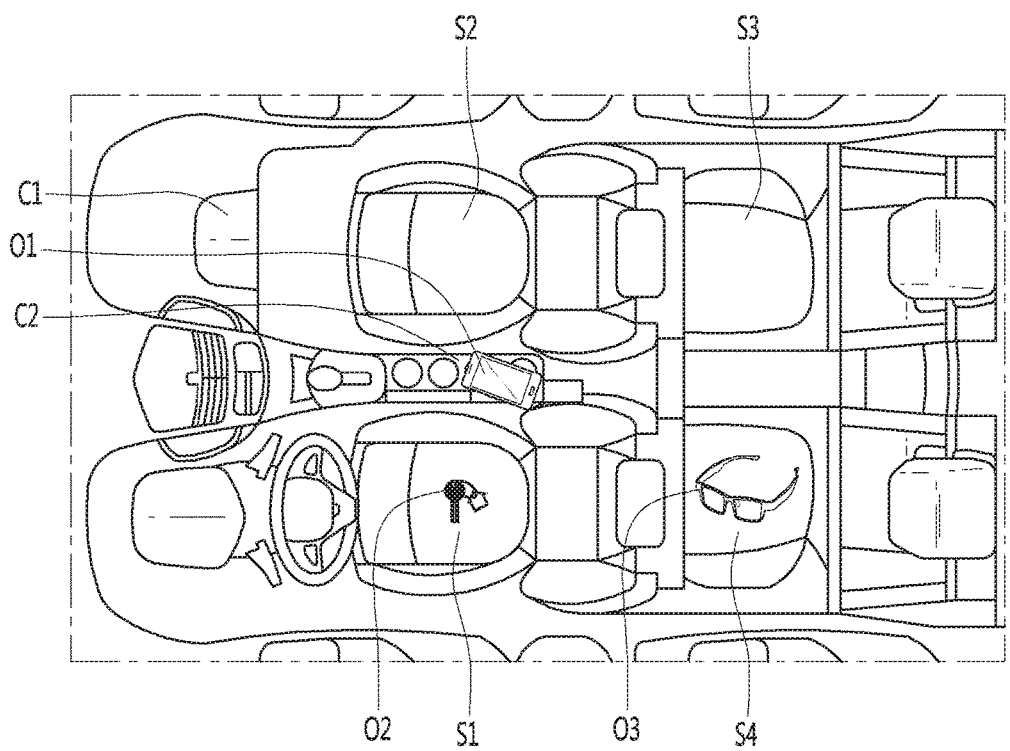

For example, referring to FIG. 4B, the processor 170 can detect from an image after getting in that there are passengers between the first space S1 and a fourth space S4 and that there is a first object O1 in the second compartment C2. In addition, the processor 170 can image-search for the first object O1 detected and detect characteristic information on the first object O1.

For example, the processor 170 can use an image search DB stored in the memory 140 or use the server 500 providing an image search through the communication unit 120 to detect the object type of the first object O1. Furthermore, the processor 170 can search for an icon standing for the object type of the first object O1 together so that the alarm unit 180 can utilize later when outputting characteristic information.

Thus, the processor 170 can generate as characteristic information that there is the mobile terminal 600 in the vehicle and since the mobile terminal 600 is in the first space S1, the processor can further store in characteristic information that its owner is the passenger of the first space S1. Then, the processor 170 can output in-vehicle object state information to passengers through the alarm unit 180 when the vehicle stops so that it is possible to provide an object loss prevention service through which it is possible to check objects inside the vehicle before getting out of the vehicle.

In this instance, the processor 170 can enable the alarm unit 180 to output object state information to a passenger corresponding to the position of an object. Further the image sensor 151 can acquire an in-vehicle image when getting out of the vehicle and the acquired image can be used for detecting an in-vehicle object. Specifically, the processor 170 can compare an in-vehicle image before getting in the vehicle with an in-vehicle image when getting out of the vehicle to detect an added object as an in-vehicle object, from the in-vehicle image when getting out of the vehicle.

In addition, the processor 170 can use the information for identifying the position of a passenger to detect an owner of a lost object later. For example, referring to FIG. 4C, the processor 170 can detect a second object O2 from the first space S1 on the in-vehicle image when getting out of the vehicle through comparison with an image before getting in the vehicle, detect the mobile terminal 600 from the second compartment C2, and detect a third object O3 from the fourth space S4.

In addition, the processor 170 can generate characteristic information on objects through an image search on the first to third objects O1 to O3 detected. For example, after extracting an image including the first to third objects O1 to O3, the processor 170 can use an image search DB stored in the memory 140 or use the server 500 providing an image search through the communication unit 120 to detect the object types of the objects.

Figure 5:
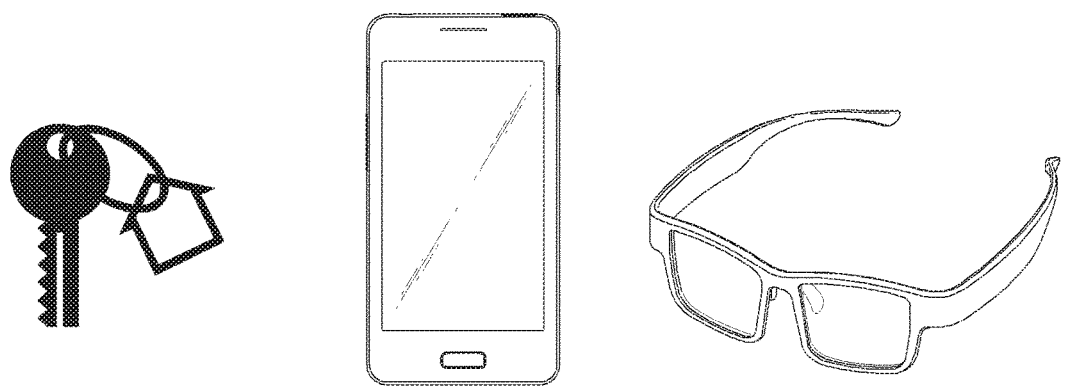
FIG. 5 is a diagram illustrating explaining a method of detecting a type of an object in a vehicle according to an embodiment.

Referring to FIG. 5, the processor 170 can find that the first object O1 is a key and provide a key emblem as an icon for the first object O1, find that the second object O2 is the mobile terminal 600 and provide a mobile terminal 600 emblem as an icon for the second object O2, and find that the third object O3 is sunglasses and provide a sunglasses emblem as an icon for the third object O3.

Furthermore, the processor 170 can search for an icon standing for the object types of objects from the memory 140 or server 500, store the searched icon as characteristic information, and then utilize when the alarm unit 180 outputs. In addition, since the first object O1 and the second object O2 are in the first space S1, the processor 170 can further store as characteristic information that the owner of an object is the passenger of the first space S1. In addition, since the third object O3 is in the fourth space S4, it is possible to further store as characteristic information that the owner of the object is the passenger of the fourth space S4.

In addition, the processor 170 can reflect the characteristic information generated in this way to generate in-vehicle object state information. In addition, the processor 170 can notify passengers of object state information through the alarm unit 180 when a notification is required so that it is possible to provide an object loss prevention service through which it is possible to effectively check objects inside the vehicle before getting out of the vehicle.

In this instance, the processor 170 can enable the alarm unit 180 to output object state information to a passenger corresponding to the position of an object. In addition, if the detected objects are in a loss state even after getting out of the vehicle, the processor 170 can transmit in-vehicle object state information to the mobile terminal 600 of a passenger together to provide a loss prevention service to a user once more.

The sensor unit 150 may include the auxiliary sensor 153 to sense an in-vehicle object and accordingly, the processor 170 can detect characteristic information on an object more accurately. In the embodiment, the auxiliary sensor 153 may include at least one of an ultrasonic sensor that precisely senses the position of the object detected by the image sensor 151, a compartment sensor that senses the open/close of a compartment, and the communication unit 120 that pairs with the mobile terminal 600.

Specifically, when an object is detected by the image sensor 151, the ultrasonic sensor 153 can irradiate an ultrasound wave to the object, receive a reflective wave reflected from the object and accurately detect the position of the object so that the position of an object is included in characteristic information.

The compartment sensor may sense that there is an object in the compartment, in characteristic information, if the compartment opens and then closes. That is, since the image sensor 151 may not be capable of capturing an image inside the compartment, the processor 170 can assume that there is an object in the compartment, by using open/close information from the compartment sensor and include the assumption in characteristic information.

Further, the communication unit 120 can sense pairing with the mobile terminal 600 and the processor 170 can determine that there is the mobile terminal 600 in the vehicle, in characteristic information. Further the sensor unit 150 may further include another sensor 155 that senses sensor information for determining an in-vehicle object loss notification time and/or image sensing time.

For example, the other sensor 155 is a door open/close sensor and can sense a time when a passenger gets in/out of the vehicle. In addition, the other sensor 155 may be an ignition on/off sensor and sense a time when the vehicle stops. The other sensor 155 is included in a vehicle sensing unit as described earlier and it is also possible to receive sensor information through the interface unit 130 according to an embodiment.

As described earlier, characteristic information obtained by processing and producing, by the processor 170, data sensed by the sensor unit 150 can provide a loss notification to a passenger through the alarm unit 180. Specifically, the alarm unit 180 may include at least one of a display unit 160 that displays in-vehicle object state information, an audio output unit 181 that outputs an object loss through audio, an optical output unit 185 that irradiates light to show the position of an object, and a haptic module 187 that notifies through vibration whether there is an object loss.

Figure 6:
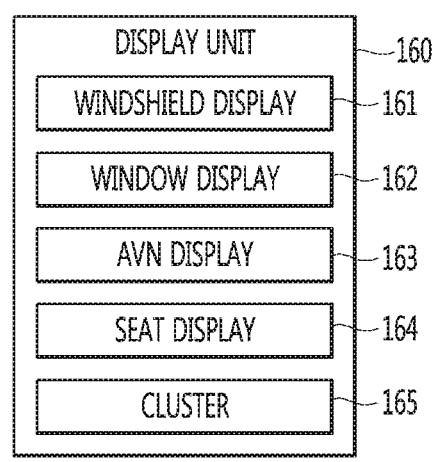
FIG. 6 is an internal block diagram of a display unit according to an embodiment.

In addition, the display unit 160 can visually display in-vehicle object state information to notify a user of a lost object. Such a display unit 160 may include a plurality of displays. Referring to FIG. 6, the display unit 160 may include at least one of a windshield display 161, a window display 62, an AVN display 163, a seat display 164, and a cluster display 165.

Referring to FIG. 3, the display unit 160 may include the windshield display 161 that displays an image on the front windshield W of the vehicle. Since the windshield display 161 displays an image on the windshield, it may be used when showing in-vehicle object state information to a driver. In this instance, a first audio output unit 181 may be disposed adjacent to a driver's seat and the first audio output unit 181a may notify a passenger of a first seat of an object loss through sound.

The windshield display unit 161 is a head up display (HUD) and may include a projection module projecting an image onto the windshield W. In addition, since a projected image projected by the projection module has predetermined transparency, a user can simultaneously see the projected image and a view after the projected image. The display unit 160 may include at least one window display 162 that displays an image on side glass.

Figure 7:
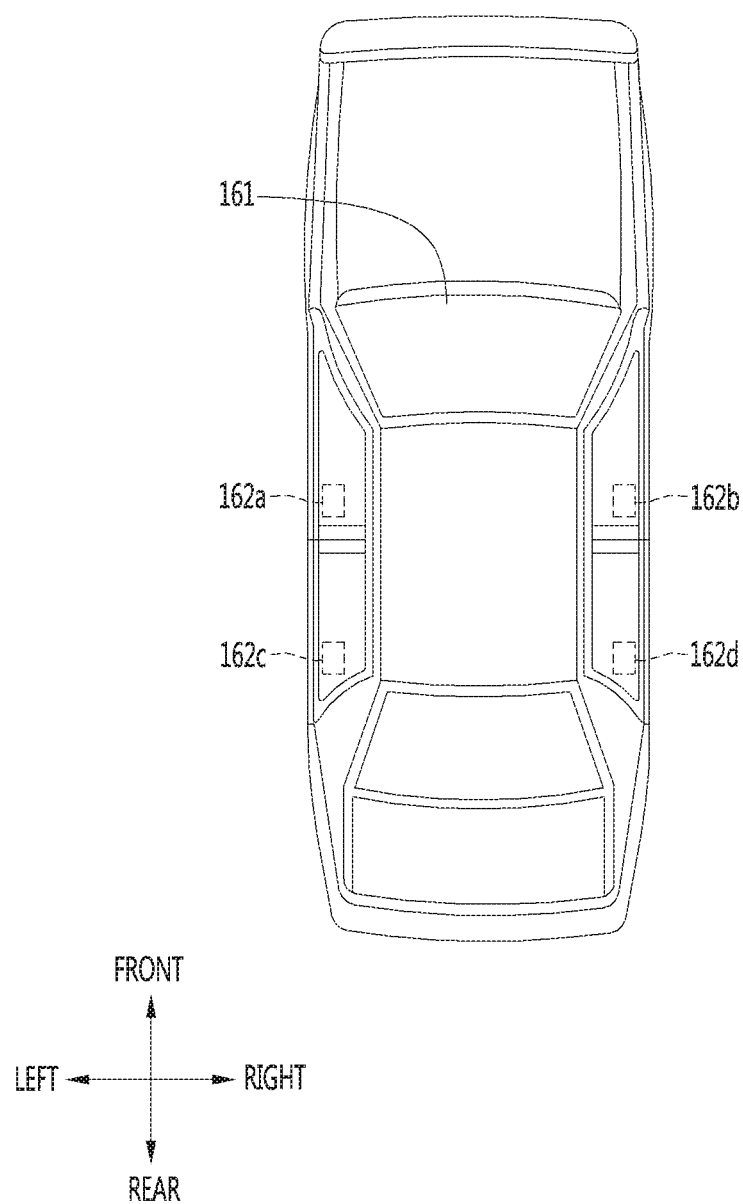
FIG. 7 is a plan view of a display unit according to an embodiment.

Referring to FIG. 7, the window display 162 may include a first window display 162a that displays an image on left side glass, a second window display 162b that displays an image on right side glass, a third window display 162c that displays an image on rear, left side glass, and a fourth window display 162d that displays an image on rear right side glass, when a driver's seat has a reference position.

Figure 8:
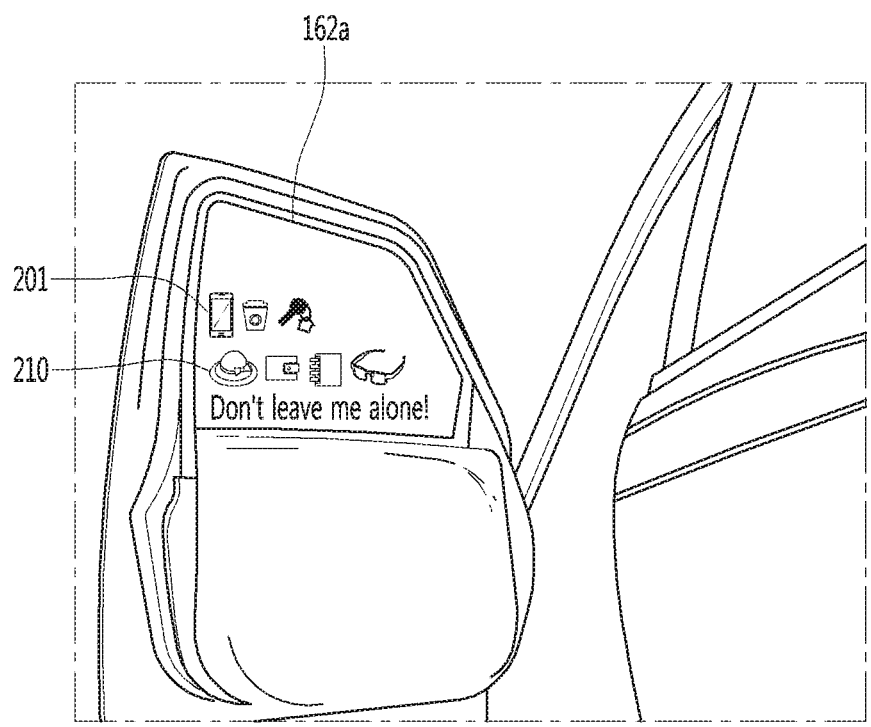
FIG. 8 represents a window display representing in-vehicle object state information when viewed from inside the vehicle according to an embodiment.

The window display 162 can display in-vehicle object state information on side glass and especially, the processor 170 can determine the window display 162 to display object state information according to the position of a passenger and may display state information on the determined window display 162. Referring to FIG. 8, when a driver gets in the vehicle, in-vehicle object state information can be displayed as an image on the first window display 162a so that a passenger can see the object state information inside the vehicle. Thus, since the driver can check an in-vehicle object through the first window display 162a when opening the door of the vehicle to get out of the vehicle, an object loss can be prevented.

Figure 9:
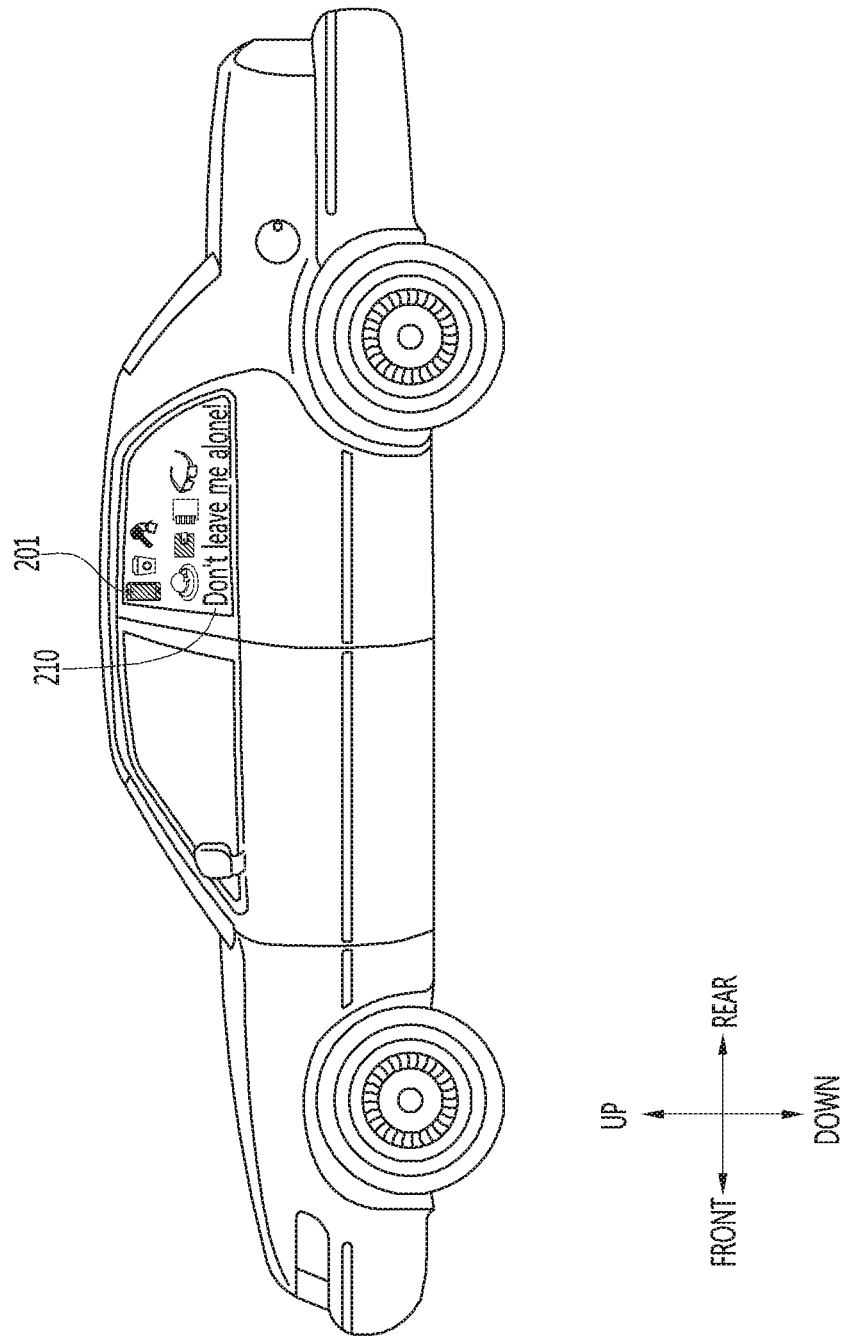
FIG. 9 represents a window display representing in-vehicle object state information when viewed from outside the vehicle according to an embodiment.

In addition, referring to FIG. 9, the first window display 162a can display in-vehicle object state information so the user can see it even outside the vehicle. In this instance, the audio output unit 181 may also notify an object loss through sound by using audio. Thus, since a driver may check a lost object through side glass after closing the door of the vehicle, an object loss may be prevented.

Further, the window display 162 may include a projection module that projects an image to glass in the same principle as a head up display. The window display 162 may use e-ink to display an image on glass. Specifically, when characteristic information is displayed through an e-ink display, the window display 162 may maintain an image display state at low power even after getting out of the vehicle. Further the above-described touch input unit is disposed on the window display 162 so that the processor 170 can use the window display and the touch input unit to provide a graphic user interface related to a loss prevention service.

Referring to FIG. 3, the display unit 160 may further include the AVN display 163 that shows navigation information and object state information a driver. The AVN display 163 may display object state information so that the driver is capable of seeing it. In addition, the processor 170 can enable the navigation information and the object state information to be displayed together. For example, the AVN display 163 may display information on an object to be carried from a specific position. The AVN display unit 163 may be implemented as at least one of a liquid crystal display (LCD), a thin film transistor-liquid crystal display (TFT LCD), an organic light-emitting diode (OLED), a flexible display, a 3D display, and an e-ink display.

Figure 10:
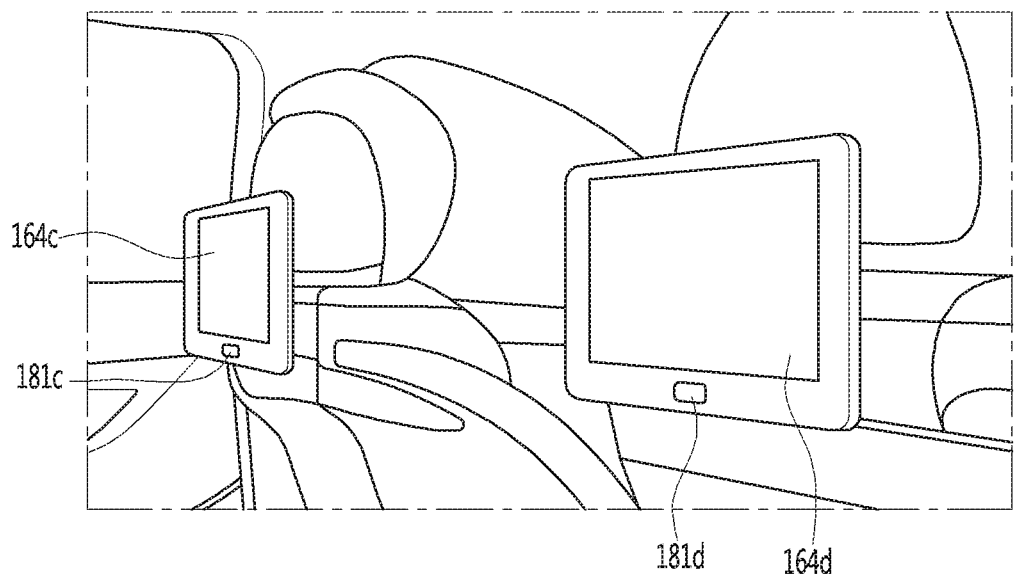
FIG. 10 represents a seat display according to an embodiment.

In addition, referring to FIGS. 3 and 10, the display unit 160 may further include a separate seat display 164 that is disposed at each seat. Specifically, a first seat display 164b may be disposed at a first seat on the right of a driver to show in-vehicle object state information to a passenger of the first seat. In this instance, a second audio output unit 181b may be disposed adjacent to the first seat display 164b and the second audio output unit 181b may notify the passenger of the first seat of an object loss through sound.

Also, a second seat display 164c may be disposed at a second seat behind a driver to show in-vehicle object state information to a passenger of the second seat. In this instance, a third audio output unit 181c may be disposed adjacent to the second seat display 164c and the third audio output unit 181c may notify the passenger of the second seat of an object loss through sound.

Further, a third seat display 164d may be disposed at a third seat behind a driver to show in-vehicle object state information to a passenger of the third seat. In this instance, a fourth audio output unit 181d may be disposed adjacent to the third seat display 164d and the third audio output unit 181d may notify the passenger of the third seat of an object loss through sound.

The processor 170 can determine a seat display 164 to display object state information according to the position of a passenger and display the object state information on the determined seat display 164. The seat display 164 may be implemented as at least one of a liquid crystal display (LCD), a thin film transistor-liquid crystal display (TFT LCD), an organic light-emitting diode (OLED), a flexible display, a 3D display, and an e-ink display. Further the above-described touch input unit is disposed on the window display 164 so that the processor 170 can use the seat display and the touch input unit to provide a graphic user interface related to a loss prevention service.

Referring to FIG. 3, the display unit 160 may further include the cluster display 165 that shows object state information to a driver. The cluster display 165 may be implemented as at least one of a liquid crystal display (LCD), a thin film transistor-liquid crystal display (TFT LCD), an organic light-emitting diode (OLED), a flexible display, a 3D display, and an e-ink display.

The processor 170 can determine a display to display object state information according to the position of a passenger. Specifically, when showing the object state information to a driver, the processor 170 can display the object state information on at least one of the windshield display 161 that is a driver side display, the first window display 162a, the AVN display 163, and the cluster display 165.

In addition, the processor 170 can select a specific seat side window display 162 and seat display 164 in order to show the object state information to a passenger of a specific seat. The processor 170 can generate an image corresponding to in-vehicle object information by using various display modes to display the generated image through the display unit 160.

Figure 11:
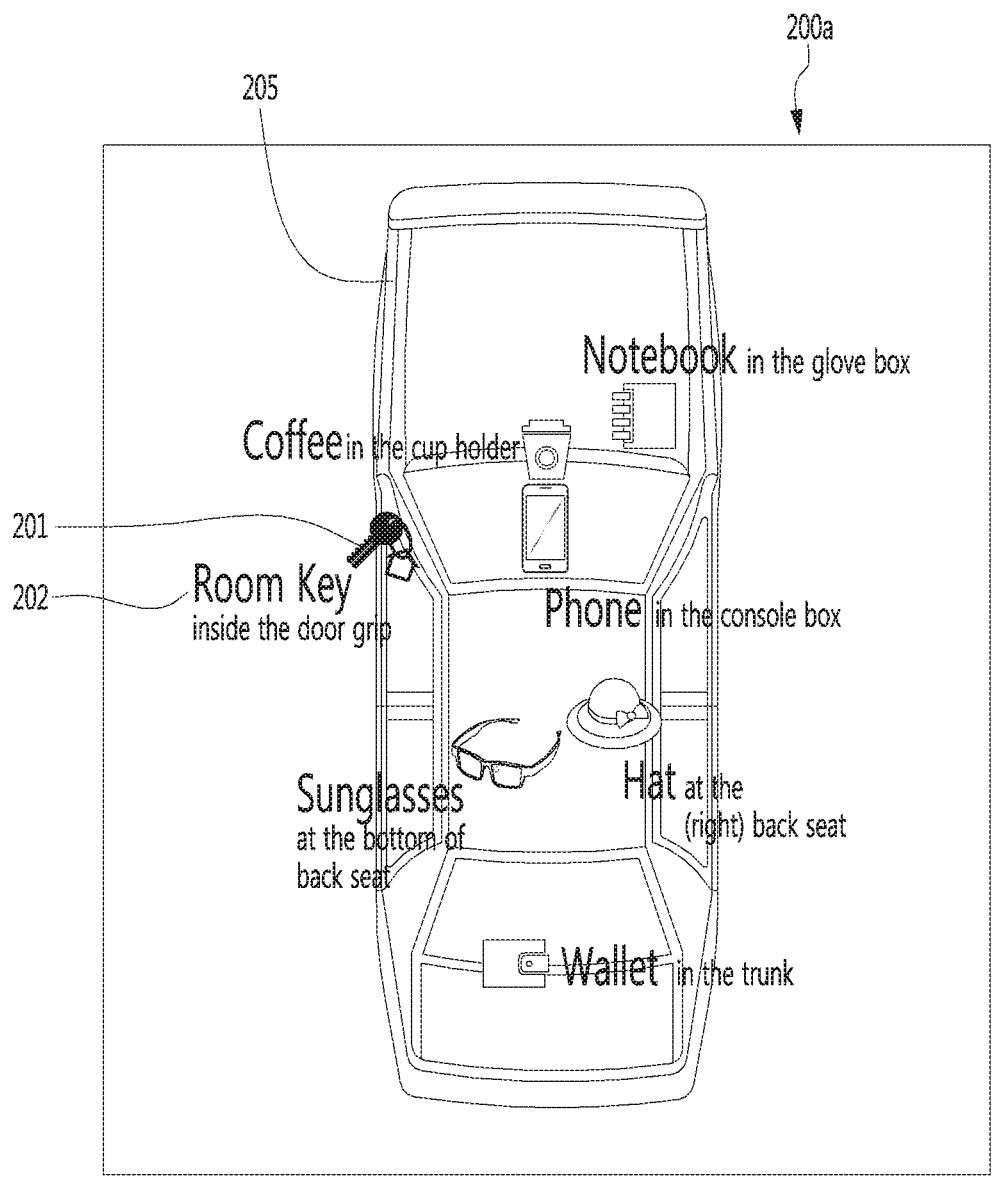
FIGS. 11 to 14 are examples of display methods of representing in-vehicle object state information according to an embodiment.

Referring to FIG. 11, by using a first display mode 200a, the processor 170 can display a virtual image 205 representing the vehicle, display an icon 201 standing for a lost object so that it corresponds to the position of an object on the virtual image 205 of the vehicle, and further display a description 202 of an object.

The first display mode 200a emphasizes the position of the object and the processor 170 can check state information on all objects in the vehicle as a whole. The first display mode 200a may be provided to a driver side. Specifically, the processor 170 can display an image employing the first display mode on at least one of the windshield display 161 that is disposed at a driver side, the first window display 162a, the AVN display 163, and the cluster display 165 so that a driver may check objects inside the vehicle at a glance.

Figure 12:
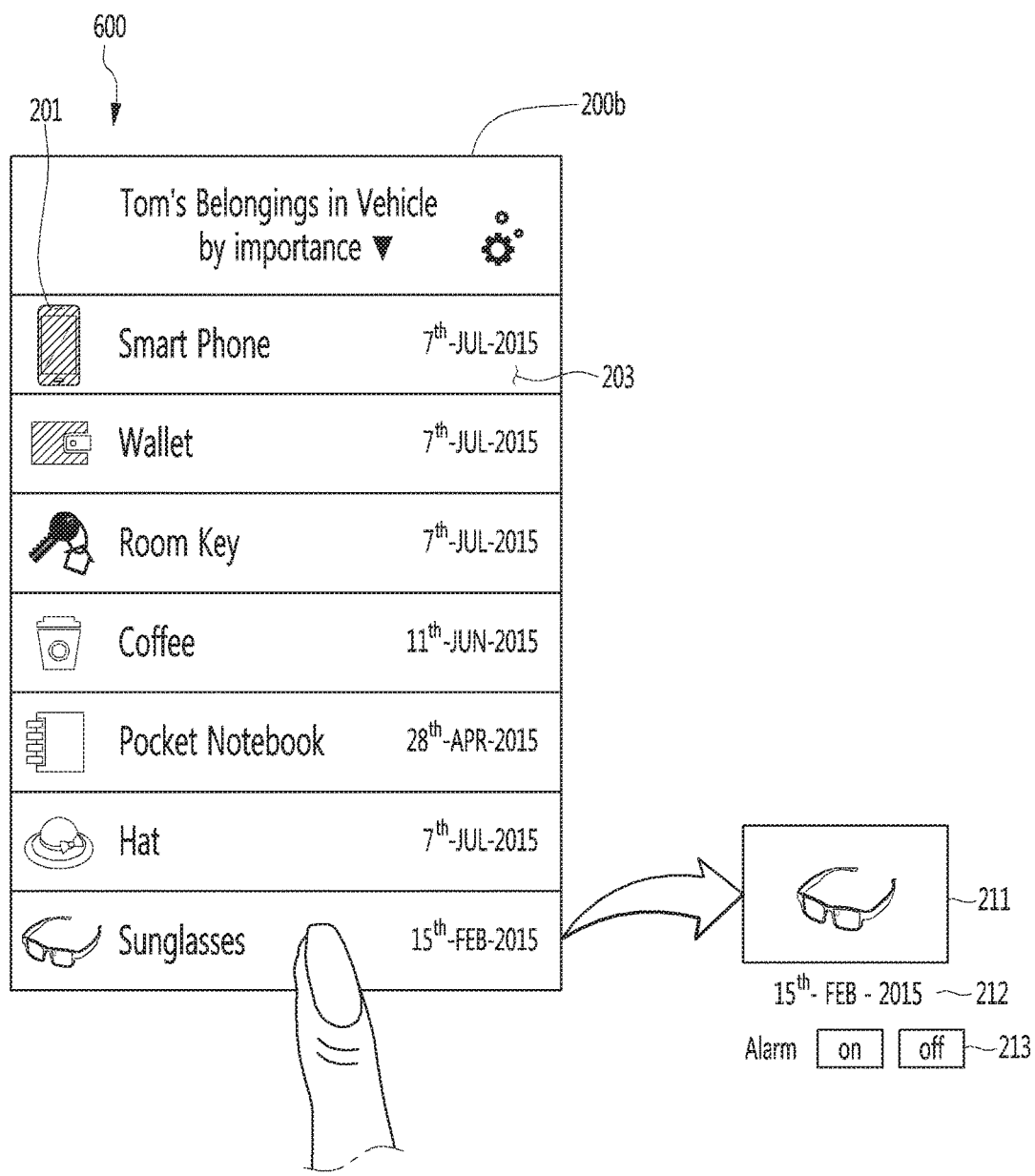

Referring to FIG. 12, the processor 170 can provide a second display mode 200b in which an icon 201 standing for an object inside the vehicle and a description 203 of an object are enumerated and displayed. In this instance, the processor 170 can consider an object loss time or importance to determine the alignment order of icons 201. For example, the object that is left in the vehicle most recently is displayed on the top end and objects may be enumerated in the order of times.

Figure 13:
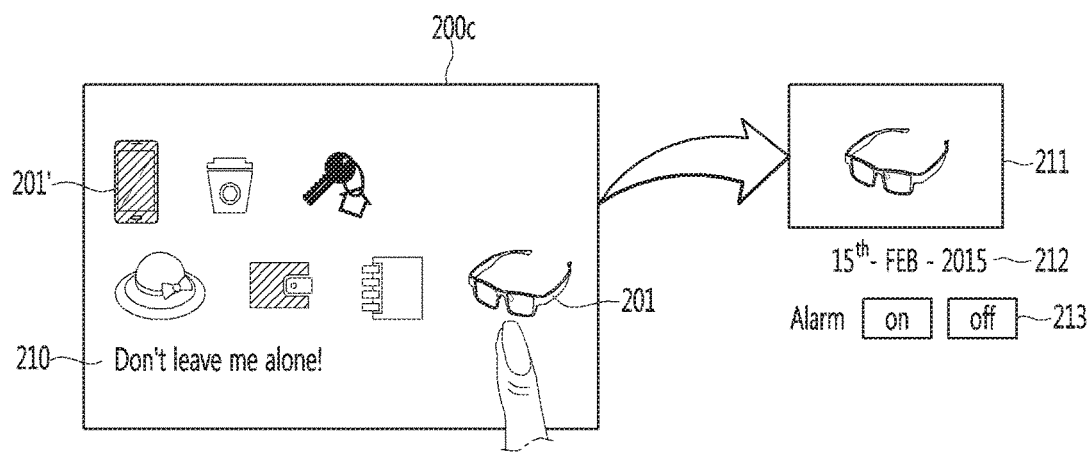

Referring to FIG. 13, the processor 170 can provide a third display mode 200c in which the icons 201 are enumerated and displayed and a warning message 210 that urges the user to carry an object is further included and displayed. In the third display mode 200c, the processor 170 can align and display icons of objects of an owner on the display unit 160 corresponding to the position of an object owner who gets out of the vehicle. For example, when a driver gets out of the vehicle, the processor 170 can display in-vehicle object state information on the first window display 161a in the third display mode 200c.

In this instance, the processor 170 can determine the orders of icons in consideration of an object loss time or importance and display the icons 201. In this example, it is possible to determine that objects leaving in the vehicle for a long time, objects that the vehicle have to keep, or belongings staying at the vehicle even though a notification has been provided many times have low importance.

When a touch input unit is disposed on the display unit 160 so that a touch screen is implemented, the processor 170 can provide a graphic user interface related to a loss prevention service. Referring to FIGS. 12 and 13, the processor 170 can further display detailed characteristic information on an object corresponding to the icon 201 and whether to continue to provide a notification 213, when sensing an input that a user touches the icon 201 displayed on the display unit 160. For example, the processor 170 can further display detailed characteristic information that includes at least one of an object image 211, an object loss time 212, and a notification on/off display 213.

The processor 170 can also provide a fourth display mode 200d in which navigation information is matched with object state information to display an object loss notification. For example, referring to FIG. 14, a path to a destination 214 may be displayed on the AVN display unit 163 and an icon 201 of an object to be carried at a destination among objects in the vehicle may be further displayed so that it is possible to assist in carrying the object from a corresponding position. A detailed description of a reservation notification that urges to carry the object from the corresponding position is described below.

The alarm unit 180 may further include an audio output unit 181 that outputs characteristic information on an object through audio. The audio output unit 181 may notify an object loss through sound to attract user attention. Specifically, the audio output unit 181 may output a loss notification through sound to passengers in seats inside the vehicle.

The audio output unit 181 may include a beeper that is disposed at each door of the vehicle to output a loss notification through sound outside the vehicle. The processor 170 can not only display object state information but also provide a loss notification through sound by using the audio output unit 181 corresponding to the position of a passenger to assist a user in recognizing a loss state.

Further the output unit 180 may further include an optical output unit that irradiates light to show the position of an object. For example, the optical output unit 185 may be light-emitting devices 185A and 185B (see FIG. 3) that are disposed at compartments. When objects are disposed at the compartments, the processor 170 can operate the light-emitting devices 185A and 185B disposed at the compartments to show an object loss state.

Lastly, the object loss prevention service providing apparatus 100 can include the processor 170 that controls the overall operations of each unit in the object loss prevention service providing apparatus 100. The processor 170 can be implemented by using at least one of an application specific integrated circuit (ASIC), a digital signal processor (DSP), a digital signal processing device (DSPD), a programmable logic device (PLD), a field programmable gate array (FPGA), the processor 170, a controller, a micro-controller, the microprocessor 170, and electrical units for executing other functions. In addition, such a processor 170 can be controlled by the control unit of the vehicle or control various functions of the vehicle through the control unit 760.

Figure 15:
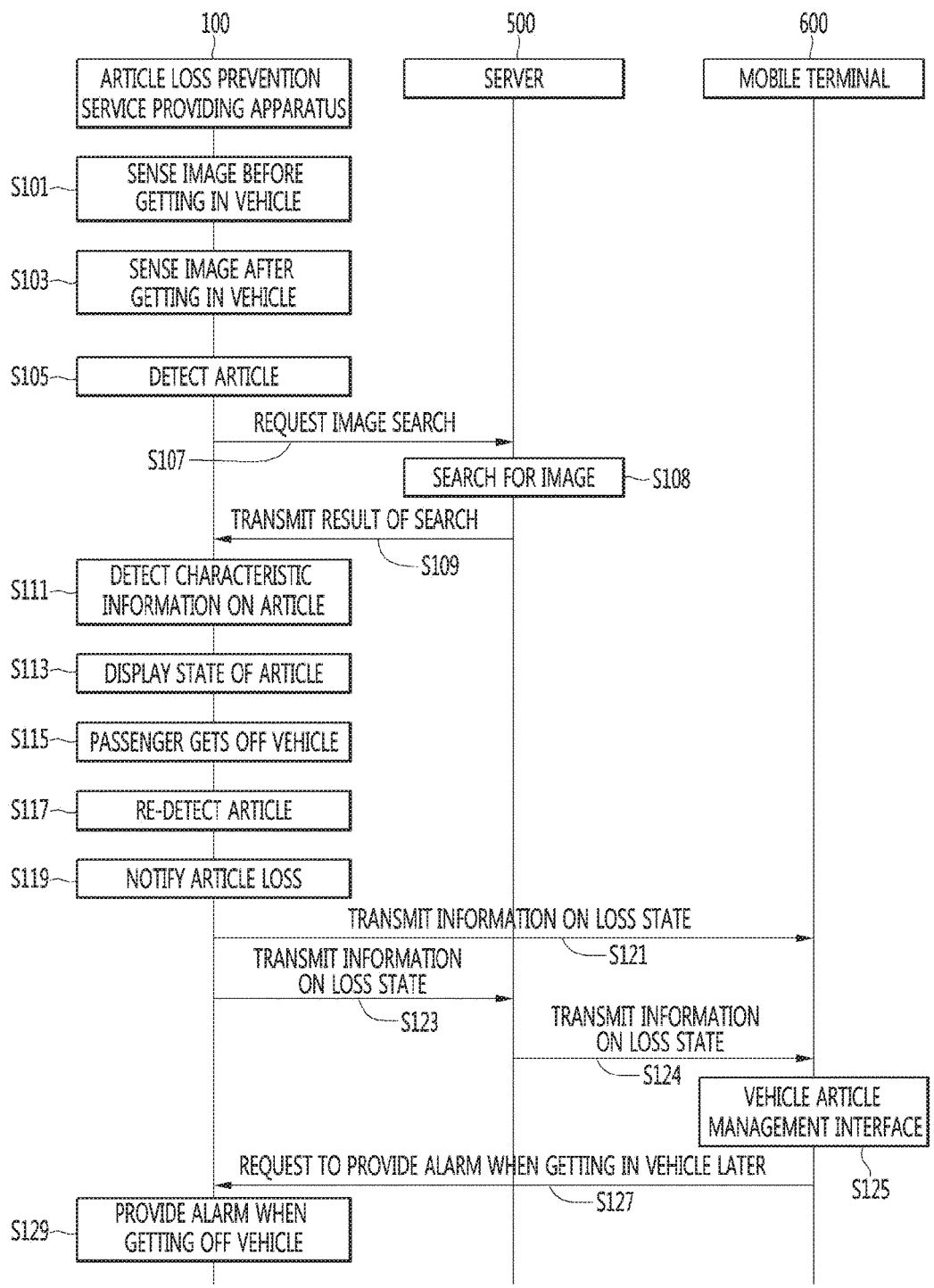
FIG. 15 is a flowchart of an object loss prevention service providing method according to an embodiment.
Figure 16:
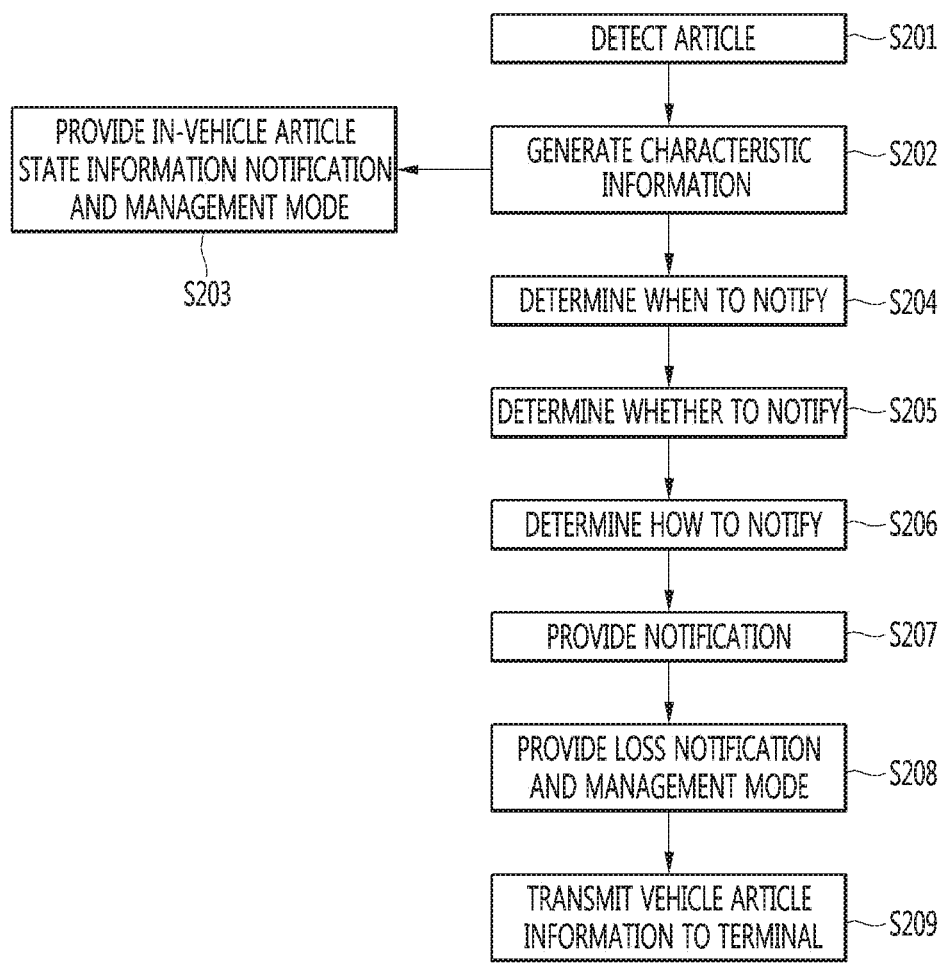
FIG. 16 is a flowchart of a method of implementing an object loss prevention service according to an embodiment.

The processor 170 controlling the operation of each unit in the object loss prevention service providing apparatus 100 to provide an object loss prevention service is described in detail with reference to FIG. 15. Referring to FIG. 15, the processor 170 can use the image sensor 151 to acquire an in-vehicle image before getting in the vehicle in step S101. In addition, the in-vehicle image before getting in the vehicle acquired in this way may be later used as a comparison target image for detecting an in-vehicle object by the processor 170.

Then, the processor 170 can acquire an in-vehicle image after getting in the vehicle in step S103. Specifically, the processor 170 can detect through a door sensor whether a passenger gets in the vehicle, and when it is sensed that the passenger has gotten in the vehicle, the image sensor 151 may capture an in-vehicle image after getting in the vehicle to acquire an image.

Next, the processor 170 can compare an in-vehicle image before getting in the vehicle with an in-vehicle image after getting in the vehicle to detect, as an in-vehicle object, an object added to the in-vehicle image before getting in the vehicle in step S105. In this instance, the processor 170 can divide the in-vehicle image into spaces to detect objects so that it is possible to detect the position of an object as characteristic information.

Specifically, the processor 170 can divide spaces based on the seats of the vehicle and designate a compartment as a separate space so that it is possible to accurately identify the position of an object when an object is detected from each space. In addition, an object representing a passenger may be excluded from a detection target and utilized as information for identifying the position of the passenger. In addition, the processor 170 can use the information for identifying the position of the passenger to detect an owner of a lost object later and include it in characteristic information.

A type of an object during the characteristic information detection can also be detected through an image search. Specifically, the processor 170 can detect an added object as an object from an image after getting in the vehicle and image-search for an image of the object from the server 500 that provides an image search through the communication unit 120, in steps S107 and S108.

In addition, a result of the image search from the server 500 is received to identify a type of an object in step S109. The processor 170 can further detect and generate characteristic information on an object, including further searching for the icon 201 standing for object types of objects from the server 500 and storing it as characteristic information, in step S111.

Next, the processor 170 can output, through the display unit 160, characteristic information on an in-vehicle object state in step S113. Specifically, the processor 170 can detect an in-vehicle object when the vehicle stops and display characteristic information on the detected object on the display unit 160 so that it is possible to provide an object loss prevention service through which a passenger can identify an object inside the vehicle before getting out of the vehicle.

Next, the processor 170 can detect a time when the passenger gets out of the vehicle, in step S115. Specifically, the processor can recognize that it is time to get off the vehicle, when a door sensor senses that a door opens. The processor 170 can also acquire an in-vehicle image when getting out of the vehicle through the image sensor 151 and the processor 170 can re-detect an in-vehicle lost object through the acquired image, in step S117.

That is, the processor 170 can compare an in-vehicle image before getting in the vehicle with an in-vehicle image when getting out of the vehicle to detect an added object as an in-vehicle object, from the in-vehicle image when getting out of the vehicle. Then, the processor 170 can output in-vehicle lost object characteristic information to passengers through the alarm unit 180 when they get off the vehicle so that it is possible to provide an object loss prevention service through which it is possible to effectively check objects inside the vehicle when getting out of the vehicle, in step S119.

That is, the processor 170 can output characteristic information through the alarm unit 180 corresponding to the position of an object owner who gets out of the vehicle, among pieces of characteristic information. Next, when an object loss state is maintained, the processor 170 can transmit characteristic information on a loss state to the mobile terminal 600 through the communication unit 120 via the server 500 or directly.

In addition, the mobile terminal 600 can provide a user interface that manages an in-vehicle lost object in step S125. Then, the processor 170 can receive a user input from the mobile terminal 600 through the communication unit 120 in step S127. For example, the processor 170 can enable a user to receive, through the mobile terminal 600, a request for a notification of carrying an object when getting in the vehicle later.

The processor 170 that has received the request can notify through the alarm unit 180 that the next passenger needs to grab an object when getting out of the vehicle, in step S129. In summary, the processor 170 can detect an in-vehicle object through the sensor unit 150. In addition, the processor 170 can detect the characteristics of the detected object and generate characteristic information.

In addition, the processor 170 can notify a user of in-vehicle object state information reflecting the characteristic information through the alarm unit 180 and thus prevent the loss of an object. Specifically, the processor 170 can detect a notification time to output in-vehicle object state information. For example, the processor 170 can detect at least one of a time when getting in the vehicle, a time when the vehicle stops, a time when the vehicle arrives at a destination, a time when getting out of the vehicle, and a time after getting out of the vehicle and notify in-vehicle object state information.

In addition, the processor 170 can determine a notification position notifying in-vehicle object state information according to the position of a passenger. For example, the processor 170 can detect the position of a passenger and use a display and an audio output unit adjacent to the position of the passenger to notify a user of the in-vehicle object state information.

The processor 170 can select and output how to notify the in-vehicle object state information according to characteristic information. Specifically, for a driver, the processor 170 can display information on a driver side display in the first mode 200a in which it is possible to check in-vehicle objects as a whole. In addition, the processor 170 can display the objects of a passenger on a passenger side display in the third display mode 200c.

In addition, the processor 170 can notify in-vehicle object state information even after a passenger gets out of the vehicle. For example, the processor 170 can output in-vehicle object state information by using the window display 162 and an external audio output unit 181 even after a passenger gets out of the vehicle.

The processor 170 can determine an object to provide a notification among detected objects. For example, the processor 170 can exclude a specific object from in-vehicle object state information when the number of notifications for the specific object is at least once.

In addition, the processor 170 can transmit the in-vehicle object state information to the mobile terminal 600 of a user through the communication unit 120, when it is difficult to provide an in-vehicle object state information notification through the alarm unit 180 because a user after getting out of the vehicle gets out of a certain radius from the vehicle.

Next, an object loss prevention service providing apparatus notifying a user of in-vehicle object state information is described in detail with reference to FIGS. 16 to 27. As shown, the processor 170 can detect an in-vehicle object, detect the characteristics of the object and then generate characteristic information, in steps S201 and S202.

Figure 17:
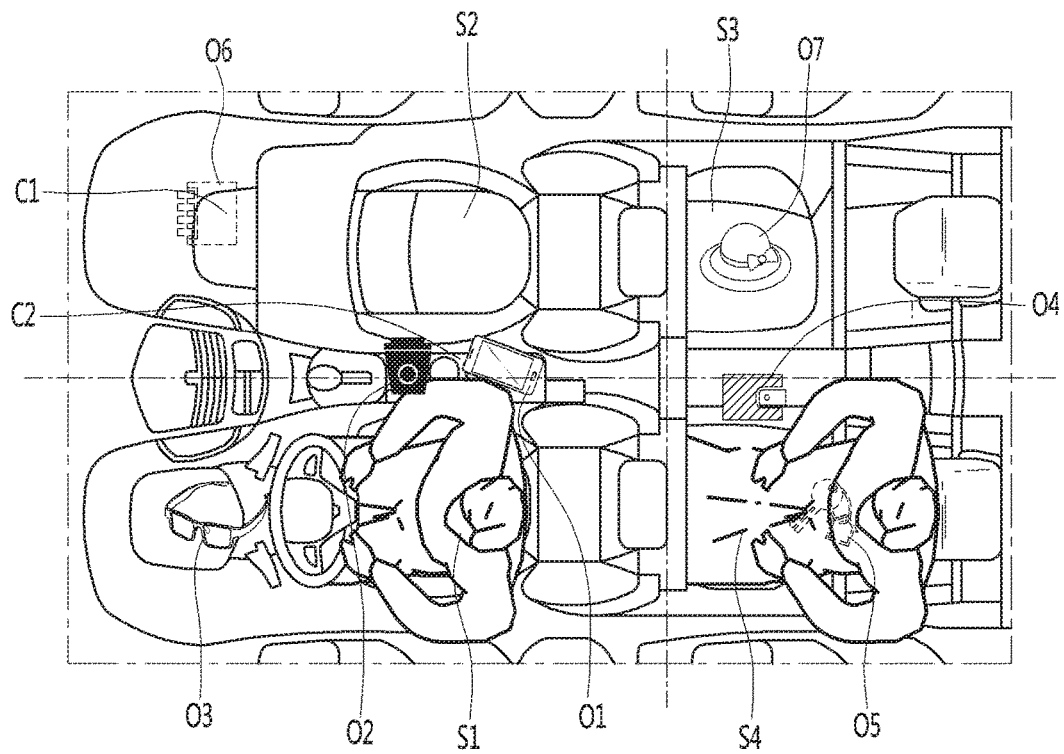
FIG. 17 represents an image inside a vehicle according to an embodiment.

For example, in FIG. 17, the processor 170 can detect that a smart phone O1 and a cup O2 are in the second compartment C2, sunglasses O3 are in the first space S1, a notebook computer O6 is in the first compartment C1, a wallet O4 is in the fourth space S4 and a hat O7 is in the third space S3, and generate characteristic information. In this instance, although a key O5 is in the fourth space S4, it is not detected because a passenger is carrying the key.

That is, the processor 170 considers that an object being in contact with a passenger is not lost because the passenger is carrying or holding the object, and thus does not include it in lost objects. Further the object may be not be sensed by an image sensor because the passenger carries it. That is, the processor 170 can determine whether a passenger holds an object, by the contact between the passenger and the object and exclude the object from notification targets when the passenger carries the object.

Figure 18:
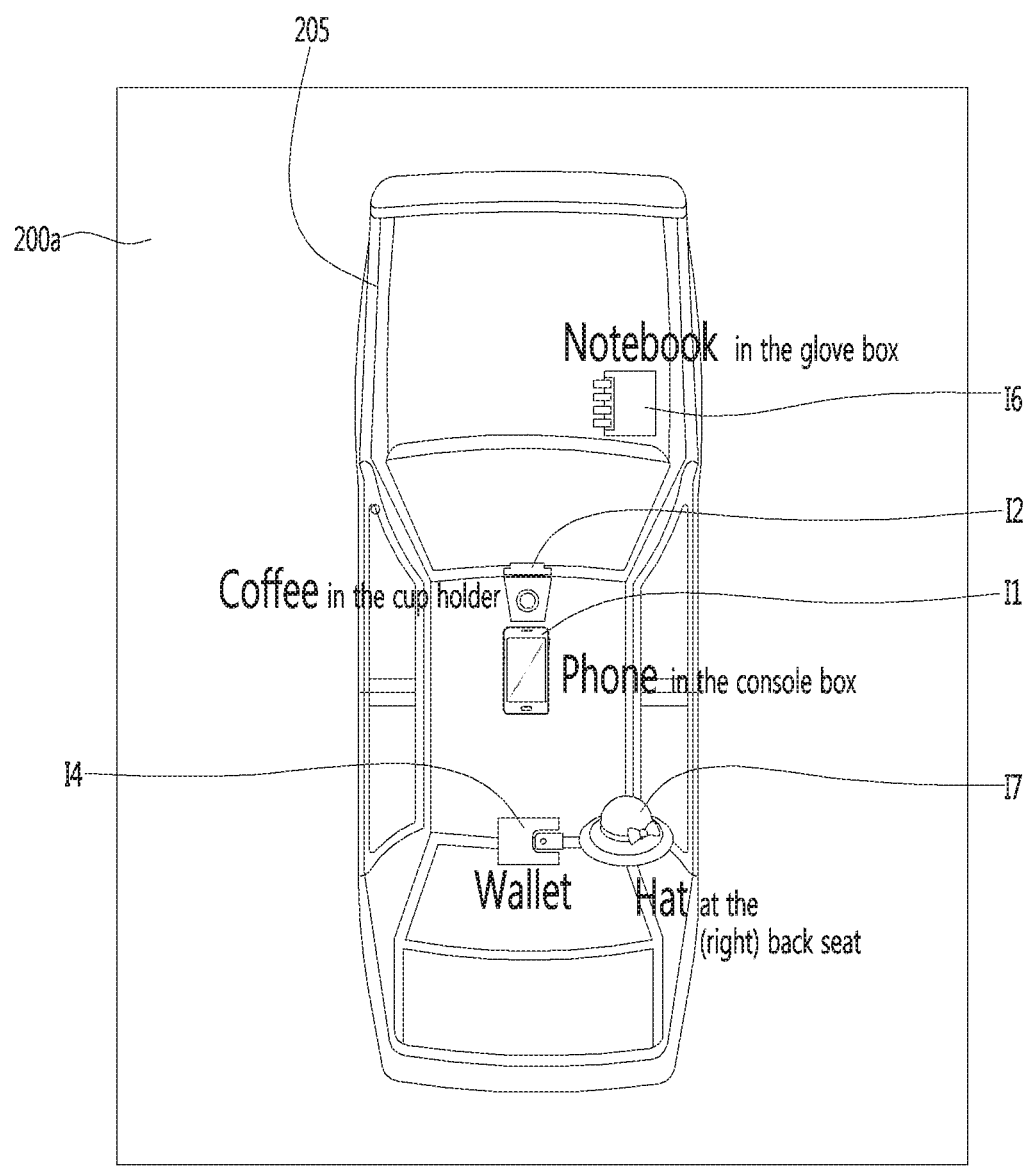
FIGS. 18 and 19 represent GUIs that display and manage in-vehicle object state information according to an embodiment.

Next, the processor 170 can reflect characteristic information and provide a mode in which in-vehicle object state information is notified to passengers and managed, in step S203. Referring to FIG. 18, the processor 170 can display detected objects on a virtual vehicle image in the first display mode 200a so that the smart phone O1, the cup O2, the wallet O4, the notebook computer O6 and the hat O7 correspond to the positions of icons I1, I2, I4, I6 and I7 representing types of objects. For the sunglasses O3, the processor 170 can stop providing a notification because the number of notifications exceeds three, and exclude from in-vehicle state information.

In addition, the processor 170 can provide a graphic user interface displaying the image displayed in the first display mode 200a on a driver side display and enable a driver to check and manage the positions of all objects in the vehicle. In addition, the processor 170 can provide an in-vehicle object management mode to a passenger in addition to a driver. Specifically, the processor 170 can provide a graphic user interface managing the object detected from the position of a passenger to a passenger side display.

Figure 19:
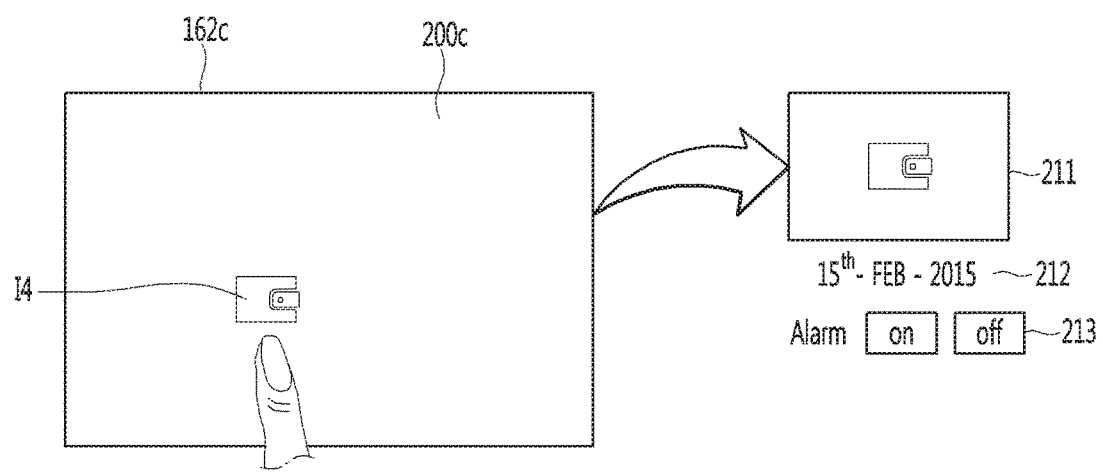

Referring to FIG. 19, the processor 170 can display the wallet O4 detected from the fourth space S4 as the fourth icon I4 on the fourth space S4 side window display in the third display mode 200c as shown in FIG. 19. In addition, an in-vehicle object management mode can be provided check whether to notify and object details through the touch of the icon I4.

Figure 20:
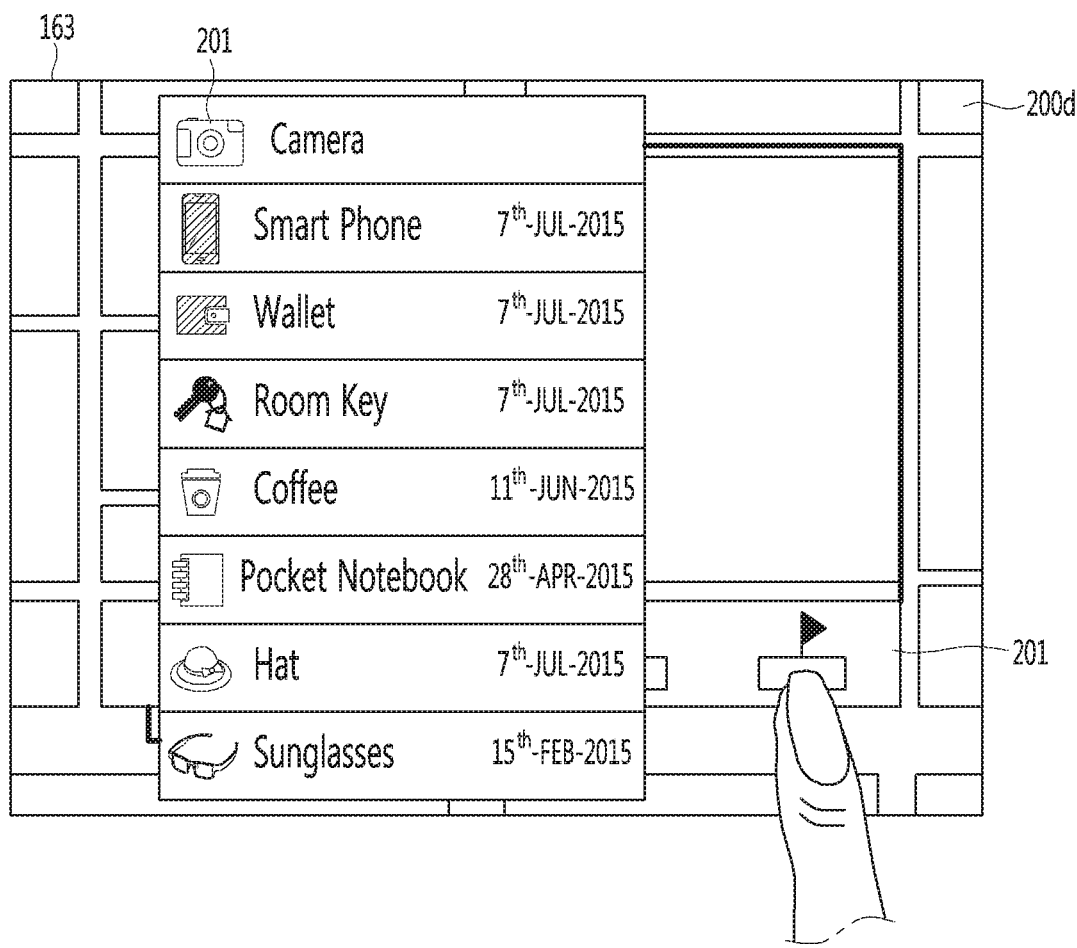
FIGS. 20 to 22 are diagrams illustrating explaining a reservation notification according to an embodiment.

The processor 170 can further provide a reservation notification service through which it is possible to manage an in-vehicle object by using navigation information. Referring to FIG. 20, the processor 170 can display a destination and a path to the destination as navigation information on the AVN display. In addition, the processor 170 can display, in the second display mode 200b, in-vehicle objects that may be set to provide a notification through a popup window when a touch input to the destination (e.g., a lone second or longer touch) is sensed.

Figure 21:
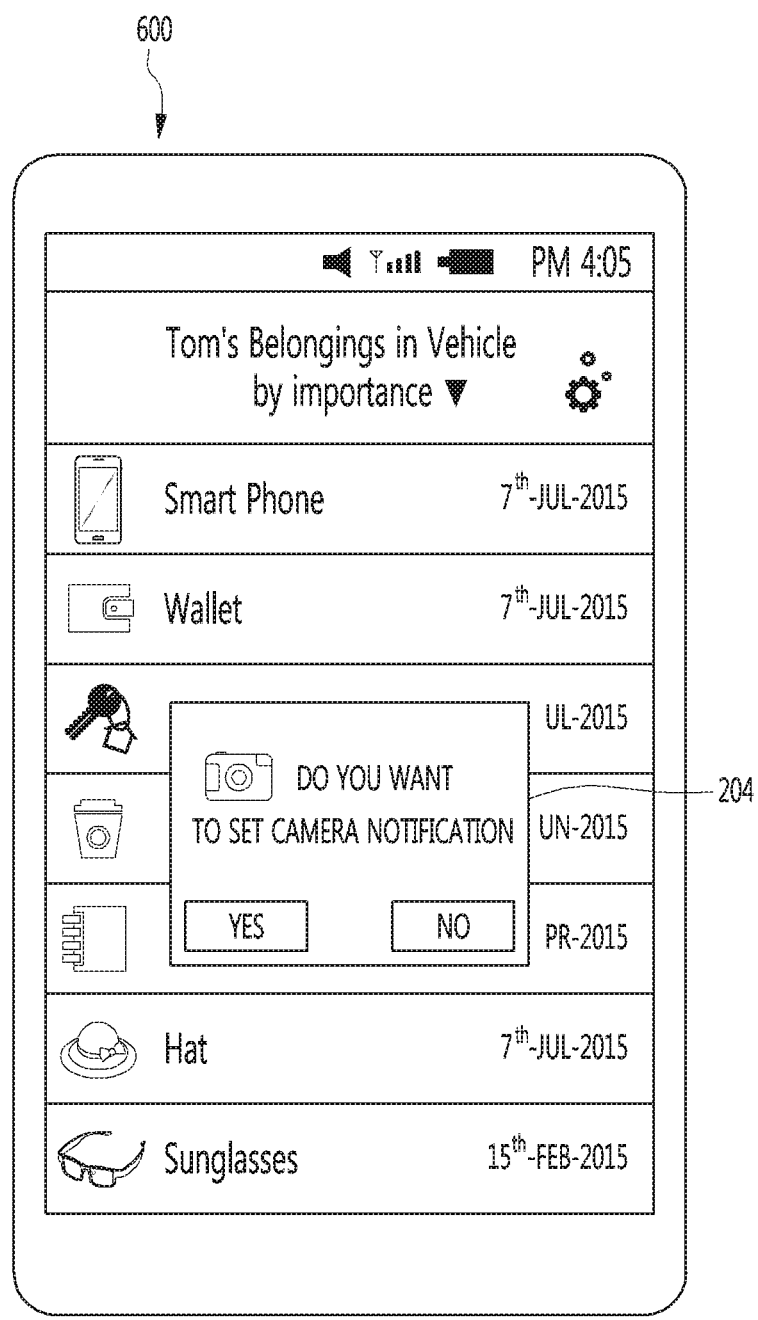
Figure 22:
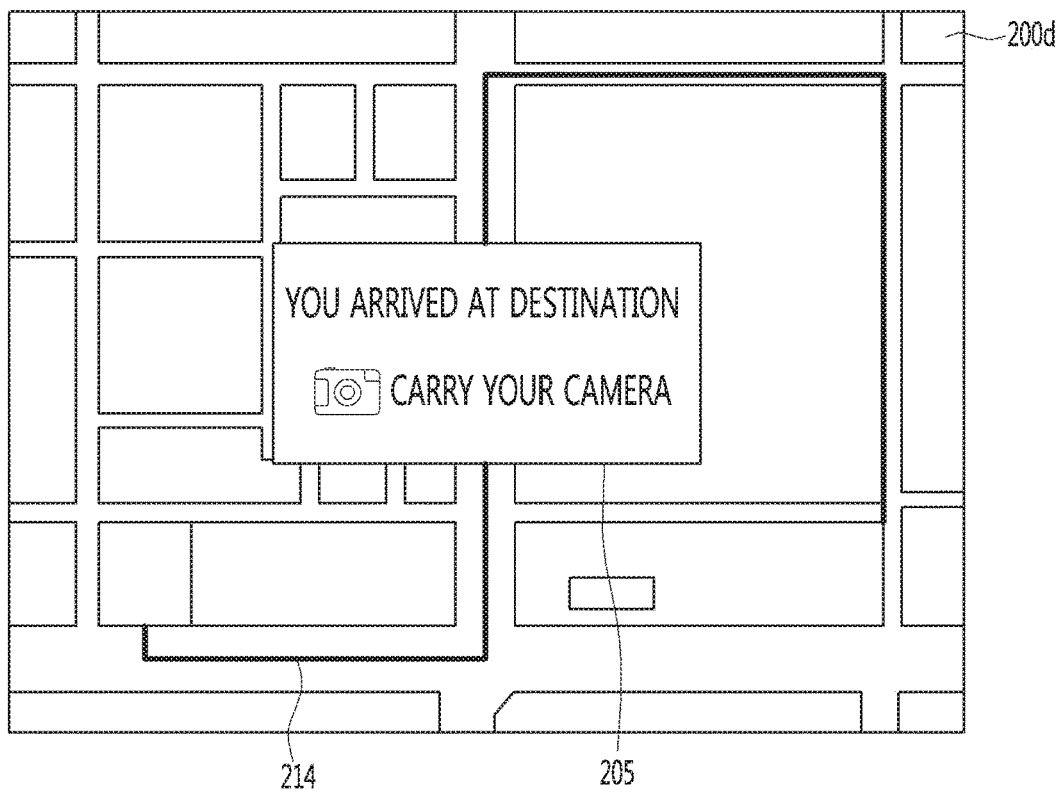
Figure 23:
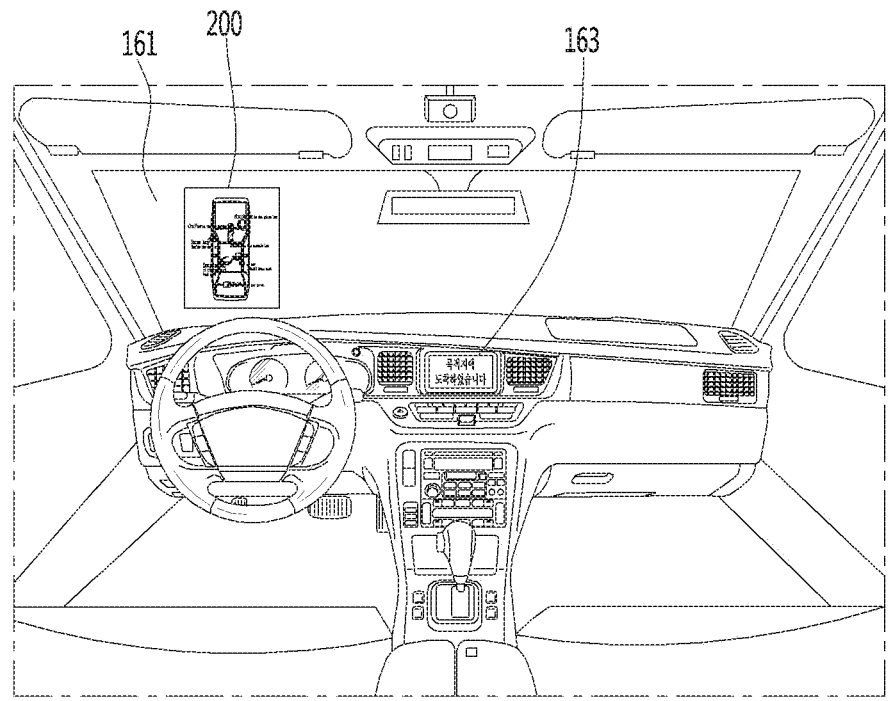
FIG. 23 represents how a windshield display displays in-vehicle object state information when the vehicle arrives at a destination according to an embodiment.

The processor 170 can also receive a reservation notification transmitted through the mobile terminal 600 of a user. Referring to FIG. 21, a user can select an object set to provide a notification when getting in the vehicle later, from an in-vehicle object management application of the mobile terminal 600, and transmit it to the object loss prevention service providing apparatus 100. The processor 170 can receive it through the communication unit 120 and notify an object set to provide a notification at a set notification time to assist a user in carrying an object.

The processor 170 can notify through the alarm unit 180 to carry a corresponding object when the vehicle arrives at a destination set to provide a reservation notification. For example, referring to FIG. 22, the processor 170 can display through a popup window on the ANV display 163 that the vehicle has arrived at the destination and an icon for a reservation notification object to be carried, and provide a notification through sound.

The processor 170 can determine a notification time to output in-vehicle object state information in step S204. For example, the processor 170 can detect at least one of a time when getting in the vehicle, a time when the vehicle stops, a time when the vehicle arrives at a destination, a time when getting out of the vehicle, and a time after getting out of the vehicle and notify in-vehicle object state information.

The processor 170 can determine an object to provide a notification among detected objects in step S205. For example, the processor 170 can exclude a specific object from in-vehicle object state information when the number of notifications for the specific object is at least once. For example, when a user leaves the sunglasses in the vehicle even though a notification for the sunglasses O3 has been provided three or more times, the processor 170 can consider that it is an object to be used in the vehicle and remove the sunglasses from in-vehicle state information.

Further the processor 170 can determine a notification method and position related to in-vehicle object state information in step S206. In e.g., FIG. 17, since there are passengers in the first space S1 and the fourth space S4, it is possible to determine the alarm units 180 in the first space S1 and the fourth space S4 as notification positions. The processor 170 can select a notification method, including determining a display mode according to a display type or position.

Specifically, when it is detected that the vehicle has arrived at a destination, the processor 170 can display in-vehicle object state information on a driver side display to be capable of check all objects of the vehicle. For example, referring to FIG. 23, when the vehicle has arrived at a destination, the processor 170 can display an image employing the first display mode 200*a* on the windshield display 161 through a popup window and provide a notification through sound by using a driver side audio output unit 181.

Figure 24:
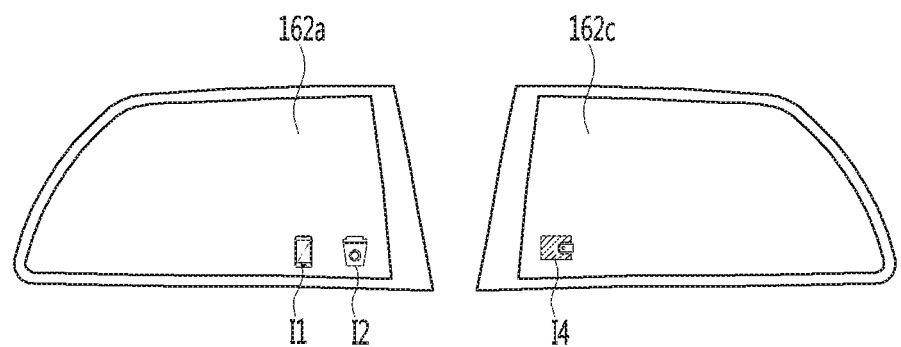
FIG. 24 represents how a window display displays in-vehicle object state information when the vehicle arrives at a destination according to an embodiment.

In addition, referring to FIG. 24, the processor 170 can notify in-vehicle object state information by displaying a popup window having an image employing the third display mode 200*c* on each passenger position's window display 162. Specifically, the first window display 162*a* may display the first icon I1 and the second icon I2 representing the smart phone O1 and the cup O2 that leave in the first space S1. The third window display 162*c* at the fourth space S4 side may display the icon I4 representing the wallet O4 that is detected from the fourth space S4.

Further the processor 170 can detect whether a passenger gets out of the vehicle, detect lost objects when the passenger gets out of the vehicle, and notify through the alarm unit 180 that there are lost objects.

Figure 25:
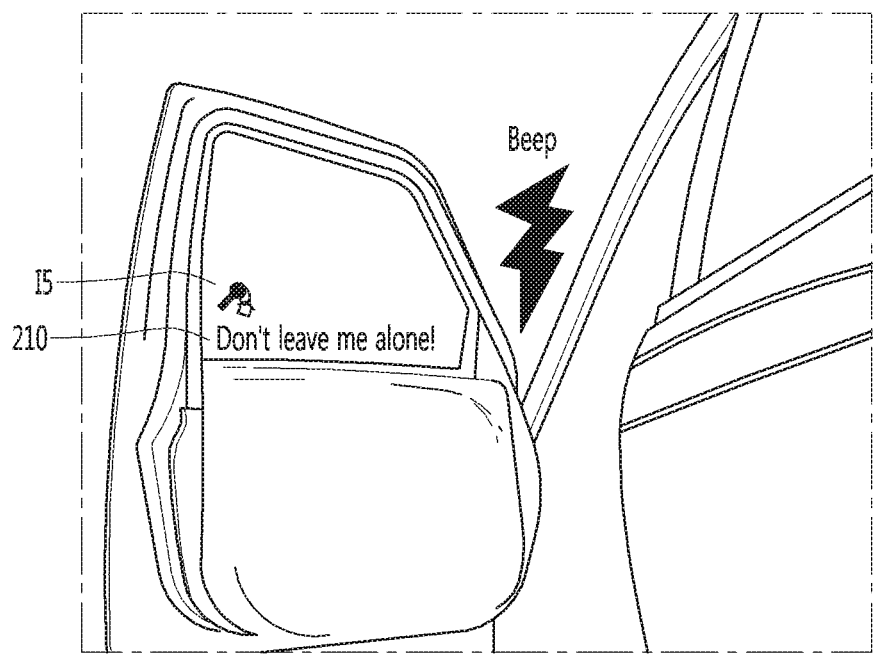
FIG. 25 represents how an alarm unit notifies in-vehicle object state information when getting out of the vehicle according to an embodiment.

For example, referring to FIG. 25, the processor 170 can detect that a passenger gets out of the vehicle when the door opens, and detect objects in the space where the passenger has stayed, and when the objects are detected, the processor 170 can notify through the passenger side alarm unit 180 that there are lost objects. More specifically, the processor 170 can display the icon I5 and the description 210 representing lost objects on the window display of a passenger who gets out of the vehicle, and provide a sound notification through a passenger side beeper.

Figure 26:
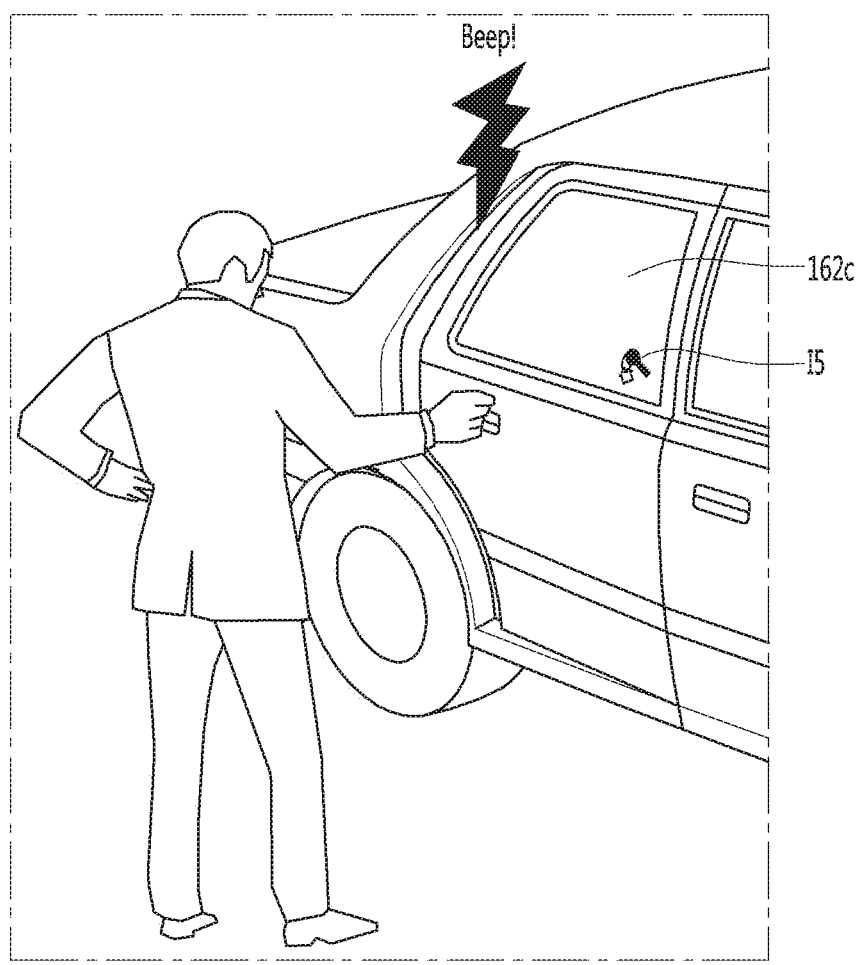
FIG. 26 represents how an alarm unit notifies in-vehicle object state information after getting out of the vehicle according to an embodiment.

In addition, the processor 170 can detect whether a passenger gets out of the vehicle, detect lost objects after the passenger gets out of the vehicle, and notify through the alarm unit 180 that there are lost objects. Referring to FIG. 26, the processor 170 can detect that the passenger gets out of the vehicle when the door closes. In addition, the processor 170 can detect lost objects from the position of the passenger after getting out of the vehicle. When the objects are detected, the processor 170 can display the icon 201 representing the detected object on a passenger side window display and provide a sound notification through a beeper of a door through which the passenger gets out of the vehicle.

Figure 27:
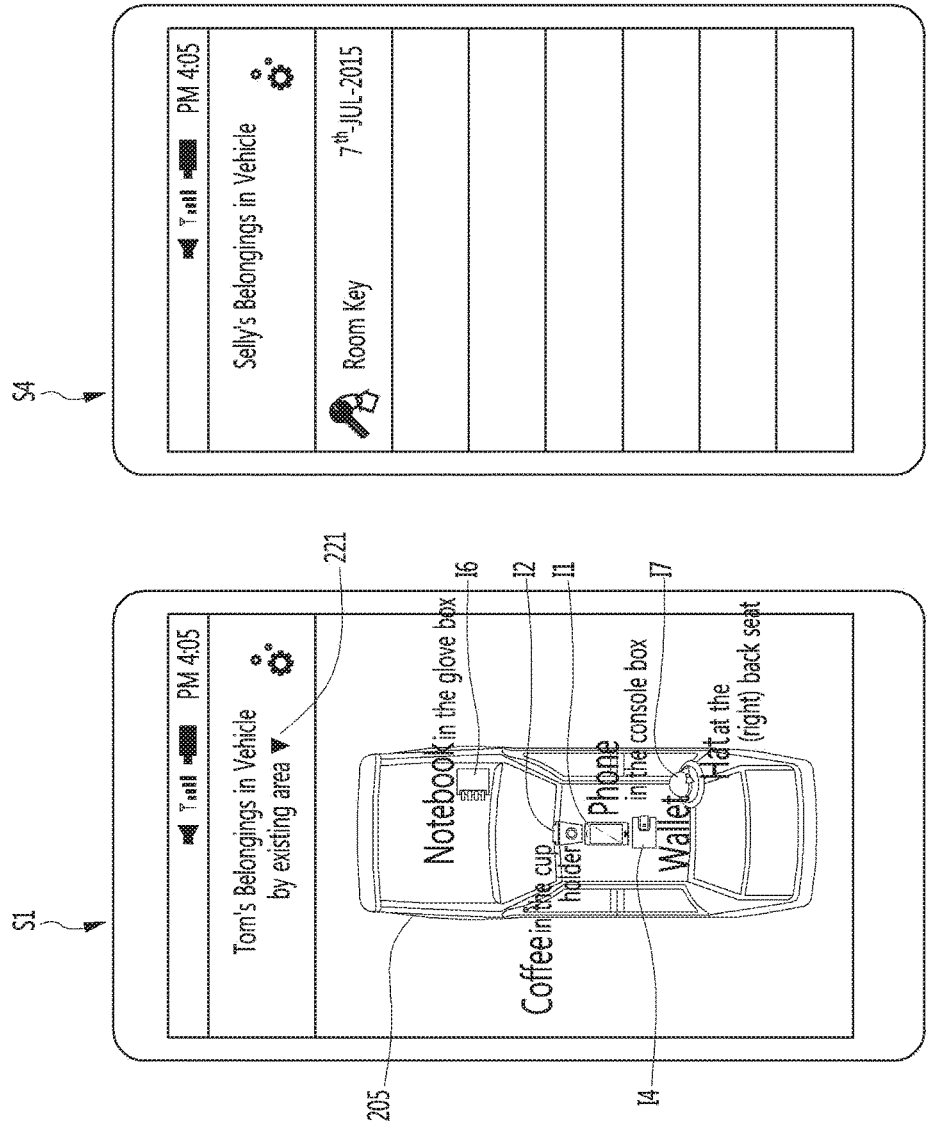
FIG. 27 represents how an alarm unit notifies the previous passengers of in-vehicle object state information after get off the vehicle according to an embodiment.
Figure 28:
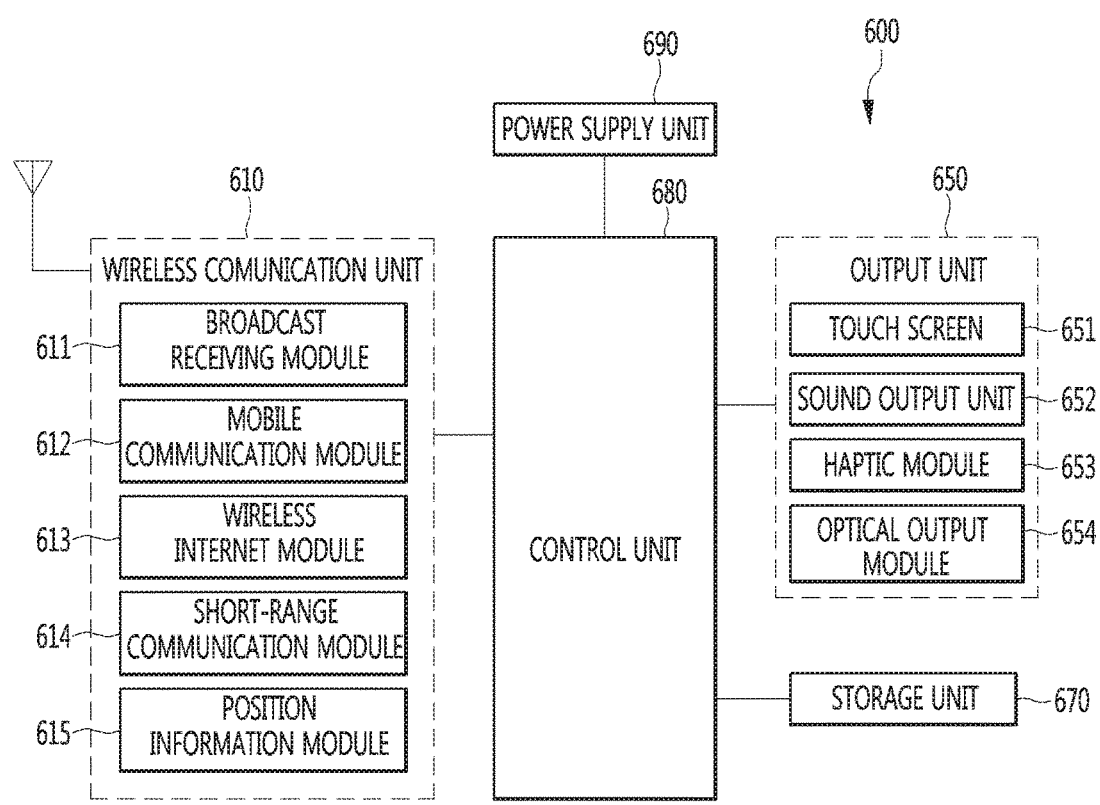
FIG. 28 is a block diagram of a mobile terminal that provides an object loss prevention service according to an embodiment.

The processor 170 can detect that the passenger gets out of a certain radius from the vehicle, and notify the lost objects through the communication unit 120. Referring to FIG. 27(*a*), object state information can be displayed on the mobile terminal 600 of a driver in the first space S1, in the first display mode 200*a* in which the states of all objects in the vehicle are represented. Also, referring to FIG. 27(*b*), the icon I5 representing the lost object detected from the fourth space S4 and characteristic information can be displayed on the mobile terminal 600 of a passenger of the fourth space S4. As described earlier, an object loss prevention service can be provided through the mobile terminal 600.

In the following, the object loss prevention service provided through the mobile terminal 600 is described in more detail with reference to FIGS. 28 to 31. The object loss prevention service can be provided through the application of the mobile terminal 600, when a user is away from the vehicle. The mobile terminal 600 may include a wireless communication unit 610, an output unit 650, a storage unit 670, a control unit 680, and a power supply unit 690.

In addition, the wireless communication unit 610 may include one more modules that enable wireless communication with a vehicle or the object loss prevention service providing apparatus 100. Specifically, the wireless communication module 610 may include at least one of a broadcast receiving module 611, a mobile communication module 612, a wireless internet module 613, a short-range communication module 614, and a position information module 615, and perform wireless data communication with the object loss prevention service providing apparatus 100 by using one or more of these modules.

In addition, the output unit 650 is used to generate a visual, auditory, or haptic output, may include at least one of a sound output unit 652, a haptic module 653, and an optical output module 654, and may include a touch screen 651 in which a display unit and a touch sensor forms a mutual layer structure. In addition, the touch screen 651 may function as a user input unit that provides an input interface between the mobile terminal 600 and a user and at the same time, provide an output interface between the mobile terminal 600 and the user.

That is, it is possible to provide an in-vehicle object management graphic interface to the user through the touch screen 651. Further the storage unit 670 stores data that supports various functions of the mobile terminal 600. The storage unit 670 may store many application programs or applications executed on the mobile terminal 600 or data and commands for the operation of the mobile terminal 600. An application program related to an object loss prevention service may be stored in the memory 140.

The application program may be stored in the storage unit 670 and installed on the mobile terminal 600 to perform the operation (or function) of the mobile terminal 600 by the control unit 680. The control unit 680 typically controls the overall operation of the mobile terminal 600 in addition to the application program related operation. The control unit 680 may process a signal, data, information, etc. input or output through the above-described components or execute the application program stored in the storage unit 670 to provide appropriate information or function to a user or process related information or function.

In addition, the control unit 680 may control at least some of the components discussed with reference to FIG. 12 in order to execute the application program stored in the storage unit 670. Furthermore, the control unit 680 may combine and operate at least two of the components in the mobile terminal 600 in order to execute the application program.

The power supply unit 690 receives external power and internal power under the control of the control unit 680 to supply power to the components in the mobile terminal 600. The power supply unit 190 may include a battery, which may be a built-in battery or a replaceable battery.

At least some of the components may cooperate in order to implement the operation, control or control method of the mobile terminal 600 according to various embodiments as will be described below. The operation, control, or control method of the mobile terminal 600 may be implemented on the mobile terminal 600 by the execution of at least one of application programs stored in the storage unit 670.

Figure 14:
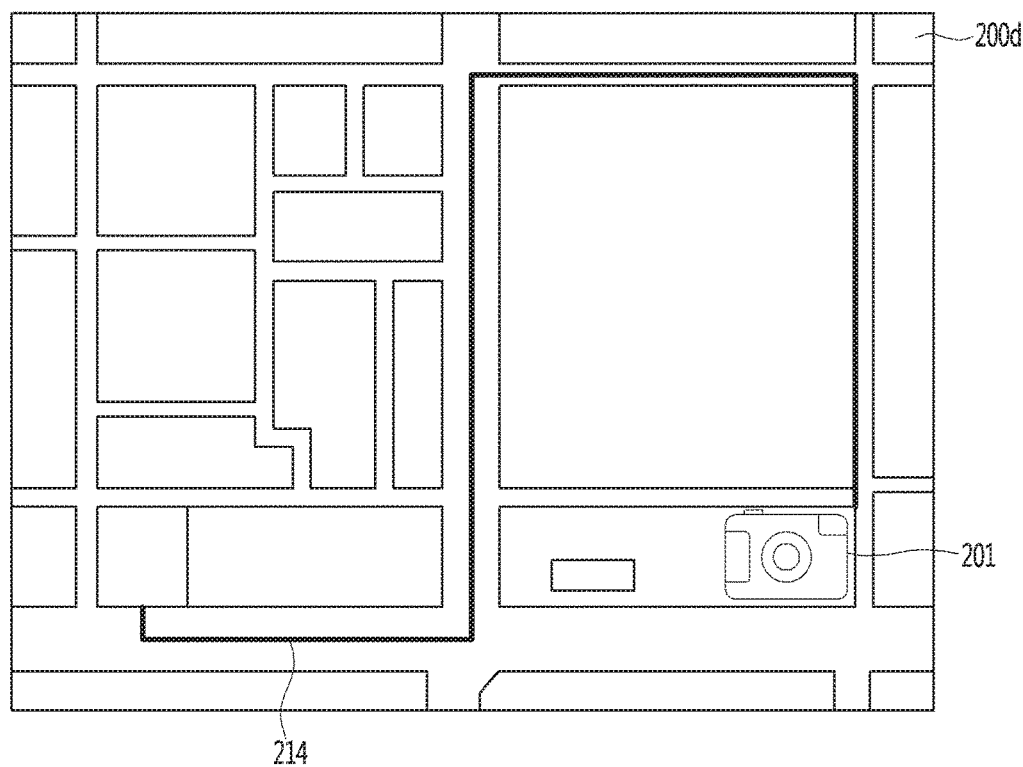

In the following, examples of providing, by the control unit 680, an in-vehicle object management graphic interface through the touch screen 651 are described with reference to FIGS. 13 to 15. The control unit 680 may align characteristic information received through the wireless communication unit 610 in various modes to display the information through the touch screen 651.

Figure 29:
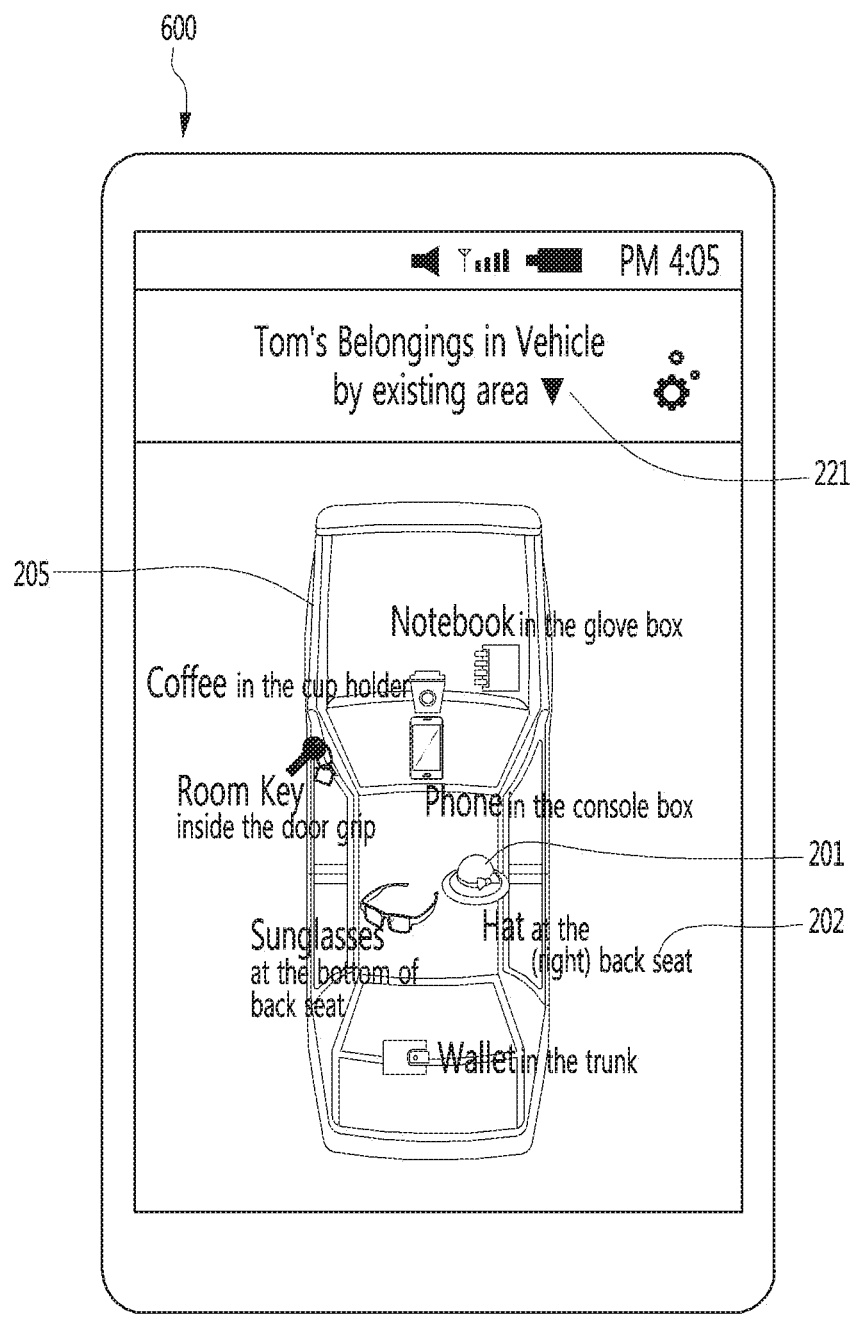
FIGS. 29 to 31 represent examples of a graphic user interface that is provided to display and manage in-vehicle object state information according to an embodiment.

Referring to FIG. 29, the control unit 680 may display a virtual image 205 representing the vehicle on the touch screen 651, display the icon 201 standing for a lost object so that it corresponds to the position of an object on the virtual image 205 of the vehicle, and further display the description 202 of the object. In this instance, the control unit 680 may also provide an input mark 221 that selects a mode expressing characteristic information.

Figure 30:
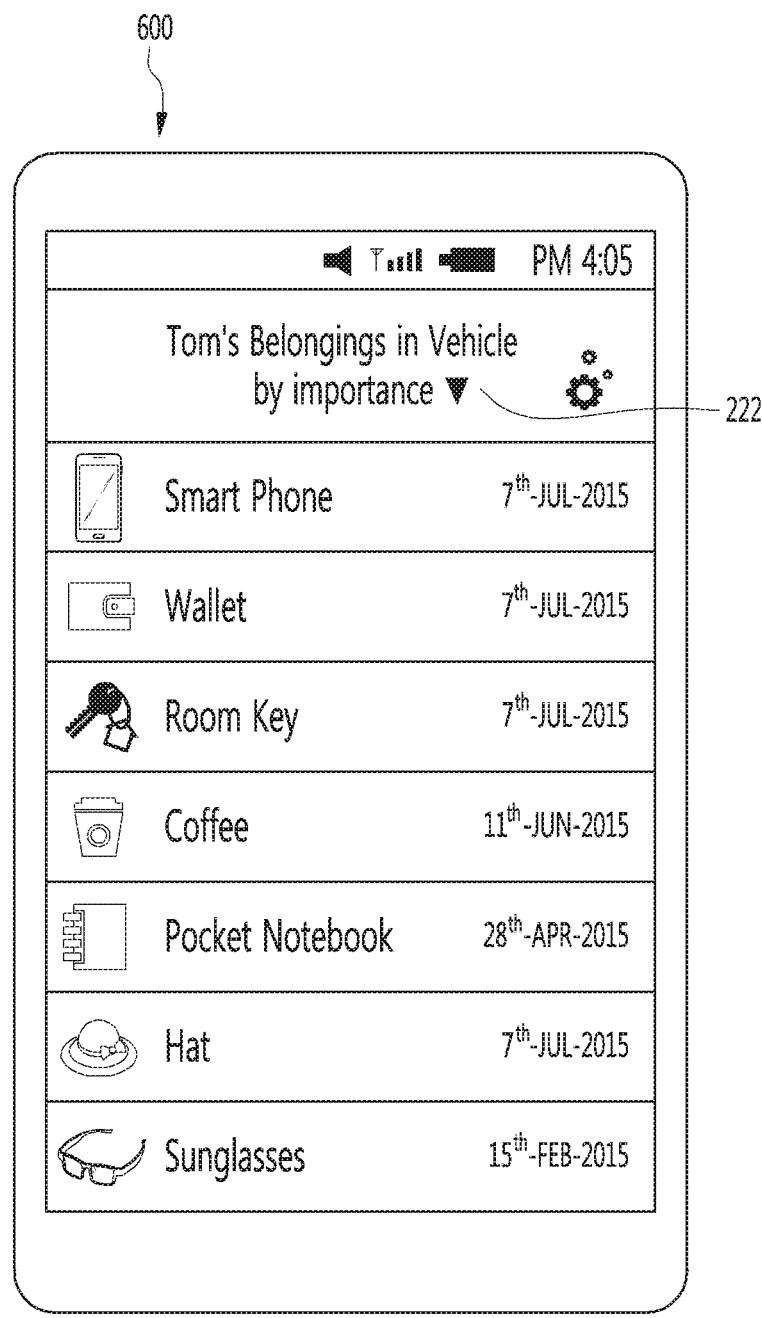

Referring to FIG. 30, the control unit 680 may display in-vehicle objects by enumerating object information according to their importance 222. Alternatively, the control unit 680 may also display objects by enumerating object information according to how long the objects leave in the vehicle.

Figure 31:
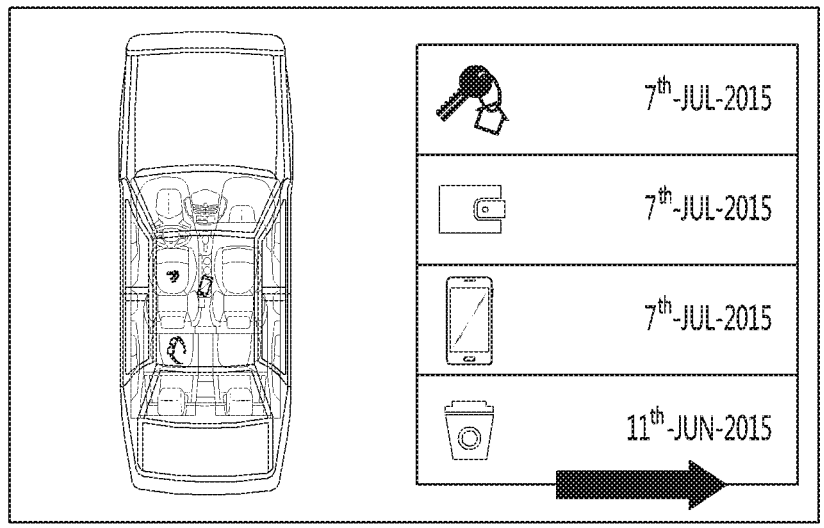

The control unit 680 may provide an interface that enables a user to perform a touch input to manage in-vehicle objects. Referring to FIG. 31, when the icon 201 displayed to correspond to the position is dragged, the control unit 680 may delete it from a list of notifications.

Also, when it is sensed that a user touches the icon 201, the control unit 680 may further display detailed characteristic information on an object corresponding to the icon 201 and whether to continue to provide a notification. For example, the control unit 680 may further display detailed characteristic information that includes at least one of an image of an object, an object loss time, and a notification on/off display.

The mobile terminal 600 may include a wearable device 601 that is worn on a user's body, neck, head or wrist. For example, there is a neckband type device that is worn on a user's neck, a headset type device that is worn on a user's head, or a watch type device that is worn on a user's wrist.

Figure 32:
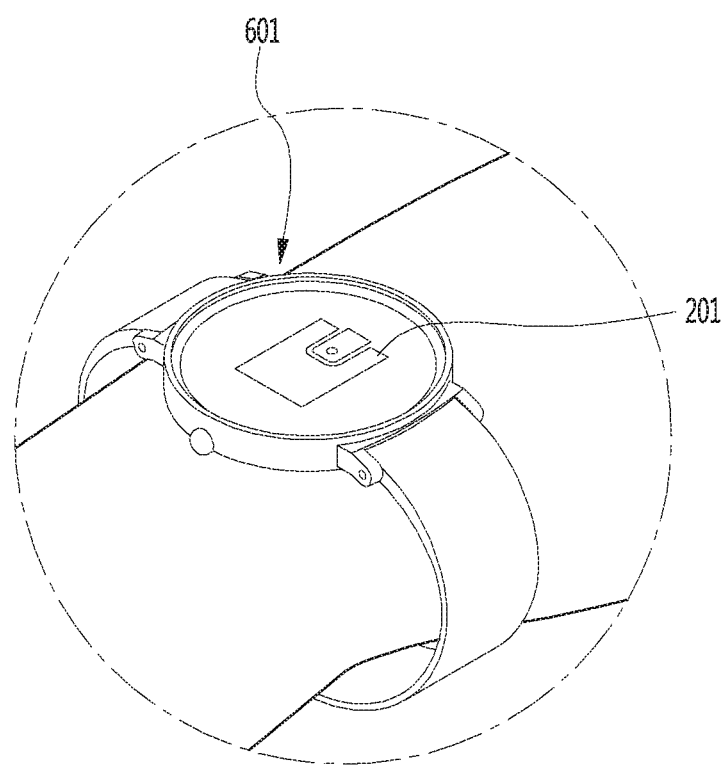
FIG. 32 represents a wearable device that provides an object loss prevention service according to an embodiment.

In addition, an object loss prevention service may also be provided through the wearable device 601. For example, when a user leaves the wallet O4 in the vehicle as shown in FIG. 32, the icon 201 may be displayed on a wearable device screen and vibration may be provided through the haptic module so that the user can prevent an object from losing.

Figure 33:
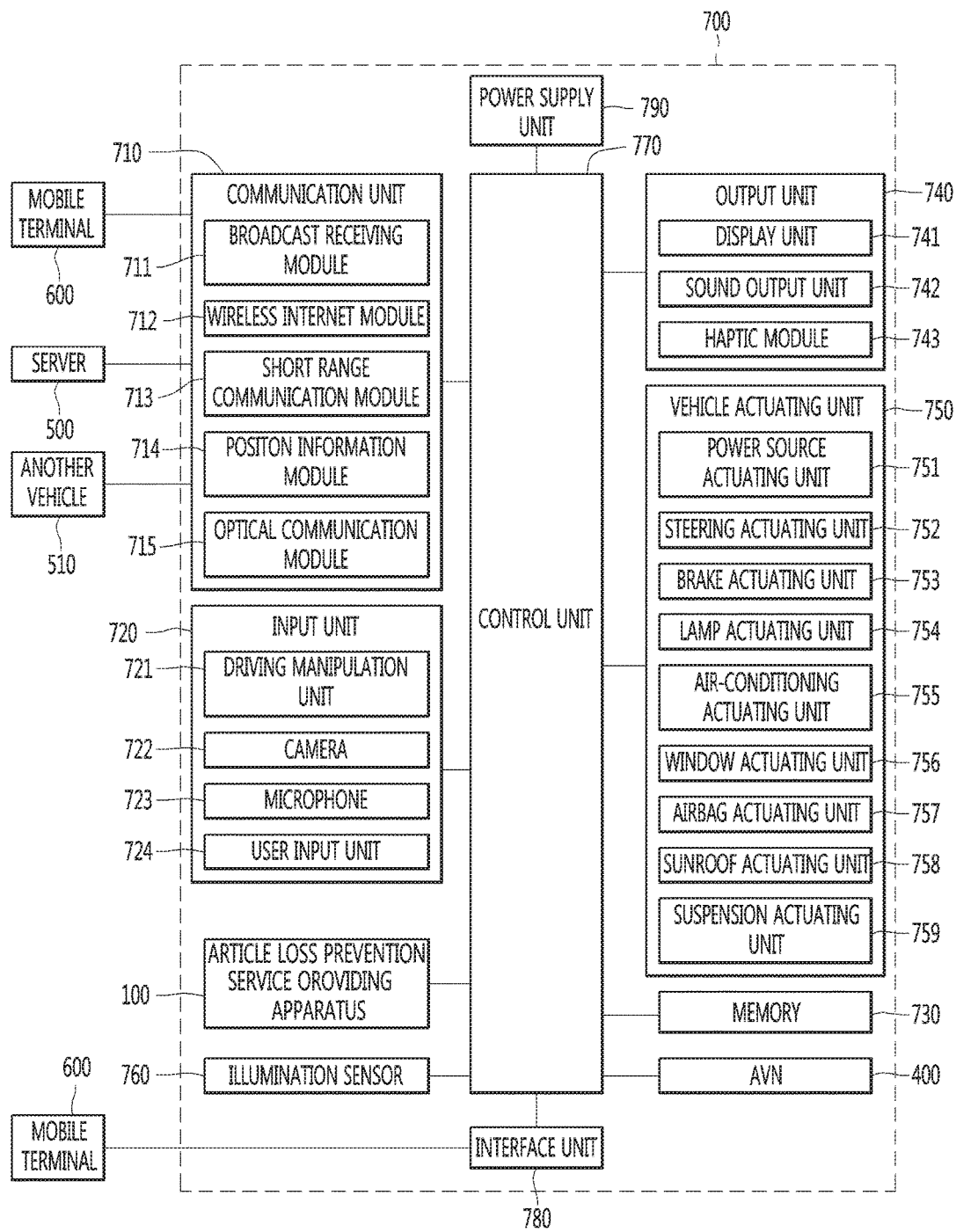
FIG. 33 is an example of an internal block diagram of a vehicle that includes an object loss prevention service providing apparatus.

Referring to FIG. 33, the object loss prevention service providing apparatus 100 can be included in the vehicle 700 so that the vehicle may provide the object loss prevention service. The vehicle 700 may include a communication unit 710, an input unit 720, a sensing unit 760, an output unit 740, a vehicle actuating unit 750, a memory 730, an interface unit 780, a control unit 770, a power supply unit 790, an object loss prevention service providing apparatus 100, and an AVN apparatus 400.

The communication unit 710 may include one or more modules that enable wireless communication between the vehicle and the mobile terminal 600, between the vehicle and an external sever 500, or between the vehicle and another vehicle 510. Further the communication unit 710 may include one or more modules that connect the vehicle to one or more networks.

The communication unit 710 may include a broadcast receiving module 711, a wireless internet module 712, a short-range communication module 713, a position information module 714, and an optical communication module 715. The broadcast receiving module 711 receives a broadcast signal or broadcast related information from an external broadcast management server through a broadcast channel. In this example, a broadcast includes a radio or TV broadcast.

The wireless internet module 712 indicates a module for wireless internet access and may be built into or external to the vehicle. The wireless internet module 712 is configured to transmit/receive a wireless signal in a communication network according to wireless internet technologies. The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (Wi-MAX), High Speed Downlink Packet Access (HSDPA), High Speed Uplink Packet Access (HSUPA), Long Term Evolution (LTE), and Long Term Evolution-Advanced (LTE-A) and the wireless internet module 712 transmits/receives data according to at least one wireless internet technology including internet technologies not listed above. For example, the wireless internet module 712 may exchange data with the external server 510 wirelessly. The wireless internet module 712 may receive weather information or road traffic information (e.g., TPEG) from the external server 510.

The short-range communication module 713 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies. Such a short-range communication module 713 may form a Wireless Area Network (WAN) to perform short-range communication between the vehicle and at least one external device. For example, the short-range communication module 713 may exchange data with the mobile terminal 600. The short-range module 713 may receive weather information or road traffic information (e.g., TPEG) from the mobile terminal 600. If a user gets in the vehicle, the mobile terminal 600 of the user and the vehicle may perform pairing on each other automatically or by the execution of an application by the user.

The position information module 714 is a module for acquiring the position of the vehicle and includes a GPS module as a typical example. For example, the vehicle may use a signal transmitted by a GPS satellite to acquire the position of the vehicle, when the GPS module is used. The optical communication module 715 may include a light transmission unit and a light reception unit.

The light reception unit may convert a light signal into an electrical signal to receive information. The light reception unit may include a photo diode (PD) for receiving light. The PD may convert light into an electrical signal. For example, the light reception unit may receive information on the front vehicle through light emitted from a light source that is included in the front vehicle.

The light transmission unit may include at least one light-emitting element for converting an electrical signal into a light signal. In this example, the light-emitting element may be a light-emitting diode (LED). The light transmission unit may convert an electrical signal into a light signal to transmit the light signal to the outside. For example, the light transmission unit may transmit the light signal to the outside through the on/off of the light-emitting element corresponding to a predetermined frequency.

According to an embodiment, the light transmission unit may include a plurality of light-emitting element arrays. According to an embodiment, the light transmission unit may be integrated into a lamp that is installed at the vehicle. For example, the light transmission unit may be at least one of a headlight, a taillight, a stop lamp, a turn signal, and a sidelight. For example, the optical communication module 715 may exchange data with the other vehicle 520 through optical communication.

The input unit 720 may include the driving manipulation mechanism 721, a camera 195, a microphone 723, and a user input unit 724. The driving manipulation mechanism 721 receives a user input for driving the vehicle. The steering input mechanism 721 receives an input for the driving direction of the vehicle from a user. The steering input mechanism 721 may be formed in the form of a wheel so that a steering input may be performed by rotation. According to an embodiment, the steering input mechanism 721 may also be formed as a touch screen, touch pad or button.

The shift input mechanism 721 receives an input for the parking P, driving D, neutrality N, and rear movement R of the vehicle from the user. The shift input mechanism 721 may be formed in the form of a lever. According to an embodiment, the shift input mechanism 721 may also be formed as a touch screen, touch pad or button.

The acceleration input mechanism 721 receives an input for the acceleration of the vehicle from the user. The brake input mechanism 721 receives an input for the speed decrease of the vehicle from the user. The acceleration input mechanism 721 and the brake input mechanism 721 may be formed in the form of a pedal. According to an embodiment, the acceleration input mechanism 721 or the brake input mechanism 721 may also be formed as a touch screen, touch pad or button.

The camera 722 may include an image sensor and an image processing module. The camera 722 may process a still image or video that is obtained by an image sensor (e.g., CMOS or CCD). The image processing module may process the still image or video acquired by the image sensor to extract necessary information and transmit the extracted information to the processor 770.

The microphone 723 may process an external sound signal into electrical data. The processed data may be used in various methods according to a function that is executed at the vehicle. The microphone 723 may convert a user's voice command into electrical data. The electrical data obtained through conversion may be transmitted to the control unit 770.

According to an embodiment, the camera 722 or the microphone 723 may also be a component that is included in the sensing unit 760, and not in the input 720. The user input unit 724 receives information from the user. When information is input through the user input unit 724, the control unit 770 may control the operation of the vehicle corresponding to the input information. The user input unit 724 may include a touch-type input mechanism or mechanical input mechanism. According to an embodiment, the user input unit 724 may be disposed at a region of a steering wheel. In this instance, a driver may manipulate the user input unit 724 with his or her finger, holding the steering wheel.

The sensing unit 760 senses a signal relating to the driving of the vehicle. Thus, the sensing unit 760 may include a wheel sensor, a speed sensor, a tilt sensor, a weight sensor, a heading sensor, a yaw sensor, a gyro sensor, a position module, a vehicle forward/backward movement sensor, a battery sensor, a fuel sensor, a tire sensor, a steering sensor by steering wheel rotation, a vehicle temperature sensor, a vehicle humidity sensor, an ultrasonic sensor, a radar, a Lidar, and so on.

Thus, the sensing unit 760 may acquire sensing signals for vehicle collision information, vehicle direction information, vehicle position information (GPS information), vehicle angle information, vehicle speed information, vehicle acceleration information, vehicle tilt information, vehicle forward/backward movement information, battery information, fuel information, tire information, vehicle lamp information, vehicle temperature information, vehicle humidity information, steering wheel rotation angle, and so on.

The sensing unit 760 may further include an acceleration pedal sensor, a barometric pressure sensor, an engine speed sensor, an Air Flow Sensor (AFS), an Air Temperature Sensor (ATS), a Water Temperature Sensor (WTS), a Throttle Position Sensor (TPS), a TDC sensor, a Crank Angle Sensor (CAS), and so on. The sensing unit 760 may include a biometric recognition information sensing unit. The biometric recognition information sensing unit senses and acquires biometric recognition information on a passenger. The biometric recognition information may include fingerprint information, iris-scan information, retina-scan information, hand geometry information, facial recognition information, and voice recognition information.

The biometric recognition information sensing unit may include a sensor that senses biometric recognition information of the passenger. In this instance, the monitoring unit 150 and the microphone 723 may operate as sensors. The biometric recognition information sensing unit may acquire hand geometry information and facial recognition information through the monitoring unit 150.

The output unit 740 is used for outputting information processed by the control unit 770 and may include the display unit 741, the sound output unit 742, and the haptic output unit 743.

The display unit 741 may display information processed by the control unit 770. For example, the display unit 741 may display vehicle related information. In this example, the vehicle related information may include vehicle control information for direct control over the vehicle or driver assistance information for a driving guide for a driver. In addition, the vehicle related information may include vehicle state information that indicates the current state of the vehicle, or vehicle operation information relating to the operation of the vehicle.

The display unit 741 may include at least one of an LCD, a TFT LCD, an OLED, a flexible display, a 3D display, and an e-ink display. The display unit 741 may form a mutual layer structure with a touch sensor or be integrally formed to implement a touch screen. The touch screen may function as the user input unit that provides an input interface between the vehicle and the user, and also provide an output interface between the vehicle and the user. In this instance, the display unit 741 may include a touch sensor sensing a touch of the display unit 741 to be capable of receiving a control command by the touch. Accordingly, when the display unit 741 is touched, the touch sensor senses the touch, and the control unit 770 may generate, based on the touch, a control command corresponding to the touch. A thing input by the touch may be a letter, a number, or a menu item that may be instructed or designated in various modes.

The display unit 741 may include a cluster so that a driver may see vehicle state information or vehicle operation information simultaneously with driving. The cluster may be located on the dashboard. In this instance, the driver may see information displayed on the cluster, maintaining forward view. According to an embodiment, the display unit 741 may be implemented as a HUD. When the display unit 741 is implemented as the HUD, it is possible to output information through a transparent display that is installed on the windshield. Alternatively, the display unit 741 may include a projection module to output information by using image that is projected onto the windshield.

The sound output unit 742 converts an electrical signal from the control unit 770 into an audio signal and outputs the audio signal. Thus, the sound output unit 742 may include a speaker and so on. The sound output unit 742 may also output sound corresponding to the operation of the user input unit 724.

The haptic output unit 743 generates a haptic output. For example, the haptic output unit 743 may enable a steering wheel, a safety belt and a seat to vibrate so that a user can recognize an output. The vehicle actuating unit 750 may control the operations of various apparatuses of the vehicle. The vehicle actuating unit 750 may include a power source actuating unit 751, a steering actuating unit 752, a brake actuating unit 753, a lamp actuating unit 754, an air-conditioning actuating unit 755, a window actuating unit 756, an airbag actuating unit 757, a sunroof actuating unit 758, and a suspension actuating unit 759.

The power source actuating unit 751 may perform electronic control over the power source in the vehicle. For example, when the power source is a fossil fuel based engine, the power source actuating unit 751 may perform electronic control over the engine. Thus, it is possible to control the output torque of the engine. When the power source actuating unit 751 is the engine, it is possible to restrict the output torque of the engine to restrict the speed of the vehicle.

As another example, when the power source is an electricity based motor, the power source actuating unit 751 may control the motor. Thus, it is possible to control the speed, torque and so on of the motor. The steering actuating unit 752 may perform electronic control over a steering apparatus in the vehicle. Thus, it is possible to change the driving direction of the vehicle.

The brake actuating unit 753 may perform electronic control over a brake apparatus in the vehicle. For example, it is possible to control the operation of a brake installed at a wheel to decrease the speed of the vehicle. As another example, by enabling brakes disposed at the left wheel and the right wheel respectively to perform different operations, it is possible to adjust the driving direction of the vehicle to the left or to the right.

The lamp actuating unit 754 may control the turn on/off of lamps that are disposed inside and outside the vehicle. Also, it is possible to control the intensity, direction and so on of light emitted from the lamp. For example, it is possible to control a turn signal lamp, a brake lamp, and so on.

The air-conditioning actuating unit 755 may perform electronic control over an air conditioner in the vehicle. For example, when the temperature inside the vehicle is high, it is possible to operate the air conditioner so that cold air is supplied into the vehicle. The window actuating unit 756 may perform electronic control over a window apparatus in the vehicle. For example, it is possible to open or close left and right windows of the vehicle.

The airbag actuating unit 757 may perform electronic control over an airbag apparatus in the vehicle. For example, it is possible to operate an airbag in a risky situation. The sunroof actuating unit 758 may perform electronic control over a sunroof apparatus in the vehicle. For example, it is possible to open or close the sunroof.

The suspension actuating unit 759 may perform electronic control over a suspension apparatus in the vehicle. For example, when the road surface is uneven, it is possible to control a suspension apparatus to reduce the vibration of the vehicle. The memory 730 is electrically connected to the control unit 770. The memory 770 may store fundamental data on units, control data for operation control over the units, and input and output data. The memory 790 may be various storage devices, such as a ROM, RAM, EPROM, flash drive, and hard drive that are hardware. The memory 730 may store various pieces of data for the overall operations of the vehicle, such as programs for processing or controlling by the control unit 770.

The interface 730 may function as a path to various kinds of external devices that are connected to the vehicle. For example, the interface unit 780 may include a port connectable to the mobile terminal 600 and be connected to the mobile terminal 600 through the port. In this instance, the interface unit 780 may exchange data with the mobile terminal 600.

The interface unit 780 may function as a path through which electrical energy is supplied to the mobile terminal 600. When the mobile terminal 600 is electrically connected to the interface unit 780, the interface unit 780 supplies electrical energy supplied from the power supply unit 790 to the mobile terminal 600 according to the control of the control unit 770.

The control unit 770 may control the overall operation of each unit in the vehicle. The control unit 770 may be named an electronic control unit (ECU). Such a control unit 770 may execute a function corresponding to a transmitted signal, according to the execution signal transmission of the object loss prevention service providing apparatus 100.

The control unit 770 may be implemented by using at least one of an ASIC, a DSP, a DSPD, a PLD, an FPGA, a processor, a controller, a micro-controller, a microprocessor, and other electrical units for executing functions. The control unit 770 may perform the role of the above-described processor 170. That is, the processor 170 of the object loss prevention service providing apparatus 100 can be set directly to the control unit 770 of the vehicle. In such an embodiment, it may be understood that the object loss prevention service providing apparatus 100 refers to some components of the vehicle.

Alternatively, the control unit 770 may also control components to transmit information requested by the processor 170. The power supply unit 790 may supply power required for the operation of each component according to the control of the control unit 770. In particular, the power supply unit 770 may receive power from a battery in the vehicle.

The AVN apparatus 400 may exchange data with the control unit 770. The control unit 770 may receive navigation information from the AVN apparatus 400 or a separate navigation apparatus. In this example, the navigation information may include set destination information, route information according to the destination, vehicle driving related map information, or vehicle position information.

The object loss prevention service providing apparatus according to the embodiments may effectively prevent a user from losing an object in the vehicle and further provide an interface that may easily manage an in-vehicle object. Specifically, the object loss prevention service providing apparatus may detect detailed characteristic information on an in-vehicle object and provide appropriate characteristic information when needed to prevent a user from losing an object in the vehicle.

In this instance, the object loss prevention service providing apparatus according to the embodiments may notify a loss state through an output unit corresponding to an owner of an object provided for each passenger. Specifically, the object loss prevention service providing apparatus according to the embodiments may display characteristic information on side glass corresponding to the position of a passenger who gets out of the vehicle, to enable a passenger leaving an object in the vehicle to intuitively recognize object loss so that it is possible to prevent loss.

The object loss prevention service providing apparatus may provide appropriate information according to a time that requires a notification. Specifically, it is possible to provide a user interface that provides a notification required during the driving, when stopping the vehicle, when getting out of the vehicle, and after getting out of the vehicle and may easily manage the notification.

In particular, the object loss prevention service providing apparatus according to the embodiments may notify a user of an in-vehicle object state through the communication unit even after getting out of the vehicle, to assist the user in efficiently managing an in-vehicle object.

The characteristics, structures, and effects described in the embodiments above are included in at least one embodiment but are not limited to one embodiment. Furthermore, the characteristic, structure, and effect illustrated in each embodiment may be combined or modified for other embodiments by a person skilled in the art. Thus, it would be construed that contents related to such a combination and such a variation are included in the scope of embodiments.

Embodiments are mostly described above. However, they are only examples and do not limit the inventive concept. A person skilled in the art may appreciate that many variations and applications not presented above may be implemented without departing from the essential characteristic of embodiments. For example, each component particularly represented in embodiments may be varied. In addition, it should be construed that differences related to such a variation and such an application are included in the scope of the inventive concept defined in the following claims.

What is claimed is:

1. An apparatus for providing an object loss prevention service in a vehicle, the apparatus comprising:
   a plurality of sensors configured to detect an in-vehicle object; and
   a processor configured to:
   generate and display in-vehicle object state information including at least one of a position and a type of the object, and
   output an alarm notifying the object has been left in the vehicle in response to the passenger getting out of the vehicle,
   wherein the plurality of sensors include a door sensor and at least one camera,
   wherein the at least one camera is configured to:
   obtain at least two of a first in-vehicle image of an interior of the vehicle before the passenger gets in the vehicle, a second in-vehicle image of the interior of the vehicle after the passenger gets in the vehicle, and a third in-vehicle image of the interior of the vehicle after the passenger gets out of the vehicle, based on detection results of the door sensor, and
   wherein the processor is further configured to:
   process the at least two of the first, second and third in-vehicle images to detect the object and detect a characteristic of the object,
   in a first display mode, match navigation information with location information of the object and display an object loss notification with respect to the object,
   wherein the object loss information comprises:
      displaying, on a display unit, a path from the vehicle to the location of the object based on the navigation information, the location of the object being a destination,
      displaying, on the display unit an icon of the object to be carried at the destination among objects in the vehicle at a position corresponding to the location of the object on the display unit, and
      in response to the vehicle arriving at the destination, displaying, on the display unit, a pop-up window indicating that the vehicle has arrived at the destination and providing an instruction to carry the object, and providing a sound notification.

2. The apparatus according to claim 1, wherein the camera is further configured to obtain a fourth in-vehicle image of the interior when the vehicle stops, and
   wherein the processor is further configured to compare at least two of the first, second, third and fourth in-vehicle images to detect the object and detect the characteristic of the object.

3. The apparatus according to claim 2, wherein the processor is further configured to:
   compare the first in-vehicle image with the fourth in-vehicle image to detect whether the object is in contact with the passenger, and
   output a notification indicating a presence of the object according to whether or not the object is contacting the passenger.

4. The apparatus according to claim 3, further comprising:
   a wireless communication processor configured to wirelessly communicate with a mobile terminal,
   wherein the processor is further configured to transmit information on the object to the mobile terminal through the wireless communication processor, in response to the object being detected from the third in-vehicle image.

5. The apparatus according to claim 1, further comprising:
   a wireless communication processor configured to wirelessly transmit and receive data with a server,
   wherein the processor is further configured to search the server for an image corresponding to the object through the wireless communication processor to detect a type of the object.

6. The apparatus according to claim 1, wherein the plurality of sensors comprise at least one of:
   a compartment sensor configured to sense the object is in a compartment inside the vehicle;
   an ultrasonic sensor configured to sense a position of the object; and
   a communication processor configured to pair the apparatus with a mobile terminal.

7. The apparatus according to claim 1, wherein the processor is further configured to output the alarm via at least one of:
   the display unit displaying the in-vehicle object state information as an image;
   at least one audio output device including a speaker or a beeper configured to output an alarm sound; and
   a light emitting device configured to irradiate light to display a position of the object.

8. The apparatus according to claim 7, wherein the display unit comprises at least one of a windshield display displaying an image on a windshield of the vehicle and a window display displaying an image on a side glass of the vehicle.

9. The apparatus according to claim 8, wherein the processor is further configured to display the in-vehicle object state information on a side glass corresponding to a seat from which the object is detected.

10. The apparatus according to claim 7, wherein the processor is further configured to display a graphic user interface on the display unit for receiving touch inputs to manage the object.

11. The apparatus according to claim 7, wherein the at least one audio output device includes a plurality of the audio output devices respectively corresponding to seats of the vehicle to provide a notification to each of the seats, and
wherein the processor is further configured to output the alarm via one of the plurality of the audio output devices corresponding to a seat on which the detected object is located.

12. The apparatus according to claim 8, wherein the processor is further configured to output the alarm in a second display mode in which a virtual vehicle image and an icon representing a type of the detected object corresponding to a position of the object on the virtual vehicle image are displayed.

13. The apparatus according to claim 12, wherein the processor is further configured to display the in-vehicle object state information on the display unit most adjacent to a seat in the second display mode among the at least one of the windshield display and the window display.

14. The apparatus according to claim 8, wherein the processor is further configured to display the in-vehicle object state information as an image on the side glass of the vehicle.

15. The apparatus according to claim 14, wherein the window display comprises a first window display configured to display an image on a left side glass, a second window display configured to display an image on a right side glass, a third window display configured to display an image on a rear, left side glass, and a fourth window display configured to display an image on a rear right side glass.

16. The apparatus according to claim 15, wherein the processor is further configured to display the in-vehicle object state information on a side glass most adjacent to a position of the detected object among the first window display through the fourth window display.

17. A method of controlling an apparatus for providing an object loss prevention service in a vehicle, the method comprising:
detecting, via a plurality of sensors including a door sensor and at least one camera, an in-vehicle object of a passenger inside the vehicle;
generating in-vehicle object state information including at least one of a position and a type of the object;
displaying, via a display, the generated in-vehicle object state information; and
outputting an alarm notifying the object has been left in the vehicle in response to the passenger getting out of the vehicle,
wherein the detecting the object comprises:
obtaining, via the at least one camera, at least two of a first in-vehicle image of an interior of the vehicle before the passenger gets in the vehicle, a second in-vehicle image of the interior of the vehicle after the passenger gets in the vehicle, and a third in-vehicle image of the interior of the vehicle after the passenger gets out of the vehicle, based on detection results of the door sensor;
detecting the object and a characteristic of the object by processing the at least two of the first, second, and third in-vehicle images;
in a first display mode, matching navigation information with location information of the object and displaying an object loss notification with respect to the object,
wherein the object loss information comprises:
displaying, on the display, a path from the vehicle to the location of the object based on the navigation information, the location of the object being a destination;
displaying, on the display an icon of the object at the destination among objects in the vehicle, at a position corresponding to the location of the object on the display; and
in response to the vehicle arriving at the destination, displaying, on the display, a pop-up window indicating that the vehicle has arrived at the destination and providing an instruction to carry the object, and providing a sound notification.

\* \* \* \* \*